United States Patent
Sato et al.

(10) Patent No.: US 12,225,470 B2
(45) Date of Patent: Feb. 11, 2025

(54) INFORMATION PROCESSING DEVICE AND INFORMATION PROCESSING METHOD

(71) Applicant: SONY GROUP CORPORATION, Tokyo (JP)

(72) Inventors: Masanori Sato, Tokyo (JP); Sawako Kiriyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 366 days.

(21) Appl. No.: 17/612,236

(22) PCT Filed: Apr. 20, 2020

(86) PCT No.: PCT/JP2020/017096
§ 371 (c)(1),
(2) Date: Nov. 18, 2021

(87) PCT Pub. No.: WO2020/246157
PCT Pub. Date: Dec. 10, 2020

(65) Prior Publication Data
US 2022/0248334 A1 Aug. 4, 2022

(30) Foreign Application Priority Data

Jun. 3, 2019 (JP) .................................. 2019-103498

(51) Int. Cl.
*H04W 52/14* (2009.01)
*H04L 1/00* (2006.01)
(Continued)

(52) U.S. Cl.
CPC ........... *H04W 52/14* (2013.01); *H04L 1/0061* (2013.01); *H04W 52/285* (2013.01); *H04W 52/367* (2013.01)

(58) Field of Classification Search
CPC . H04W 52/14; H04W 52/285; H04W 52/367; H04L 1/0061; H04L 1/08;
(Continued)

(56) References Cited

U.S. PATENT DOCUMENTS

2007/0066305 A1* 3/2007 Deguchi ............... H04W 36/18
455/436
2016/0081082 A1* 3/2016 Cao ....................... H04W 76/15
370/329
(Continued)

FOREIGN PATENT DOCUMENTS

CN 108029119 A 5/2018
CN 108464052 A 8/2018
(Continued)

OTHER PUBLICATIONS

International Search Report and Written Opinion of PCT Application No. PCT/JP2020/017096, issued on Jul. 21, 2020, 09 pages of ISRWO.

(Continued)

*Primary Examiner* — Habte Mered
(74) *Attorney, Agent, or Firm* — CHIP LAW GROUP

(57) ABSTRACT

Provided is an information processing device that performs processing related to long-distance transmission and bidirectional communication between a plurality of terminals and a plurality of base stations.
The information processing device includes: a collection unit that collects each piece of reception information of a plurality of base stations that receives an uplink frame from a terminal; and a processing unit that processes cooperative transmission of a downlink frame from the plurality of base stations to the terminal on the basis of the reception information. After repetitive uplink frame transmission is performed by using a plurality of frequencies, a downlink frame
(Continued)

| RECEPTION LIST | COMMON | | BASE STATION 200 (UL) | | BASE STATION 201 (UL) | | Downlink | |
|---|---|---|---|---|---|---|---|---|
| | DETECTION Timing | DETECTION FREQUENCY | RECEPTION POWER | RECEPTION RESULT | RECEPTION POWER | RECEPTION RESULT | PREDICTED TRANSMISSION PERIOD (Start, End) | TRANSMISSION FREQUENCY |
| No. 1 | t1 | f1 | −65dBm | OK(100) | −105dBm | OK(100) | (t1+Period, t1+Period+T_DL) | f1 |
| No. 2 | t2 | f2 | −100dBm | OK(101) | −67dBm | OK(101) | (t2+Period, t2+Period+T_DL) | f2 |
| No. 3 | t3 | f2 | −70dBm | OK(100) | −100dBm | OK(100) | (t3+Period, t3+Period+T_DL) | f2 |
| No. 4 | t4 | f3 | −95dBm | OK(101) | −75dBm | OK(101) | (t4+Period, t4+Period+T_DL) | f3 |
| No. 5 | t5 | f3 | −80dBm | OK(100) | −83dBm | OK(100) | (t5+Period, t5+Period+T_DL) | f3 |
| No. 6 | t6 | f1 | −75dBm | OK(101) | −90dBm | OK(101) | (t6+Period, t6+Period+T_DL) | f1 |
| No. 7 | t7 | f1 | −90dBm | OK(100) | −73dBm | OK(100) | (t7+Period, t7+Period+T_DL) | f1 |
| No. 8 | t8 | f2 | −70dBm | OK(101) | −100dBm | OK(101) | (t8+Period, t8+Period+T_DL) | f2 | is performed at the same frequency after a certain period of time elapses from a detection timing of the uplink frame at each frequency.

15 Claims, 27 Drawing Sheets

(51) Int. Cl.
*H04W 52/28* (2009.01)
*H04W 52/36* (2009.01)

(58) Field of Classification Search
CPC ... H04L 5/0044; H04L 5/0035; H04L 5/0069; H04B 7/024
See application file for complete search history.

(56) References Cited

U.S. PATENT DOCUMENTS

| | | | |
|---|---|---|---|
| 2016/0219578 A1* | 7/2016 | Lim | H04B 7/026 |
| 2017/0273113 A1 | 9/2017 | Tirronen et al. | |
| 2018/0035315 A1* | 2/2018 | Molinier | H04L 5/16 |
| 2020/0295805 A1* | 9/2020 | Cao | H04W 76/15 |
| 2022/0216976 A1* | 7/2022 | Zhang | H04B 17/327 |

FOREIGN PATENT DOCUMENTS

| | | | |
|---|---|---|---|
| JP | 2017-212605 A | 11/2017 | |
| JP | 2018-152628 A | 9/2018 | |
| JP | 2018-532324 A | 11/2018 | |
| JP | 2018-538741 A | 12/2018 | |
| KR | 10-2018-0044984 A | 5/2018 | |
| WO | WO-2016132081 A1 * | 8/2016 | ........... H04B 7/2656 |
| WO | 2017/022864 A1 | 2/2017 | |
| WO | 2017/052445 A1 | 3/2017 | |
| WO | 2017/085275 A1 | 5/2017 | |
| WO | 2017/203817 A1 | 11/2017 | |

OTHER PUBLICATIONS

"Overview of "LoRa" leading LPWA and usage trends Semtec Japan Joint Meeting", SEMTECH, Jun. 3, 2019, 17 pages.

Extended European Search Report of EP Application No. 20819073.6, issued on Jun. 27, 2022, 10 pages.

Kim, et al., "Multi-BS Cooperation for DL Multi-BS Cooperative Transmission", IEEE 802.16 Broadband Wireless Access Working Group, vol. 802.16q, No. 2, Jan. 21, 2014, 12 pages.

* cited by examiner

| ORDER OF REPETITIVE TRANSMISSION OF UL FRAME | P1_UL | | P2_UL | | P3_UL | |
|---|---|---|---|---|---|---|
| | TIME | FREQUENCY | TIME | FREQUENCY | TIME | FREQUENCY |
| FIRST | ARBITRARY | f1 | ARBITRARY | f2 | ARBITRARY | f3 |
| SECOND | +T_UL | f2 | +T_UL | f3 | +T_UL | f1 |
| THIRD | +2 × T_UL | f3 | +2 × T_UL | f1 | +2 × T_UL | f2 |
| FOURTH | +3 × T_UL | f1 | +3 × T_UL | f2 | +3 × T_UL | f3 |

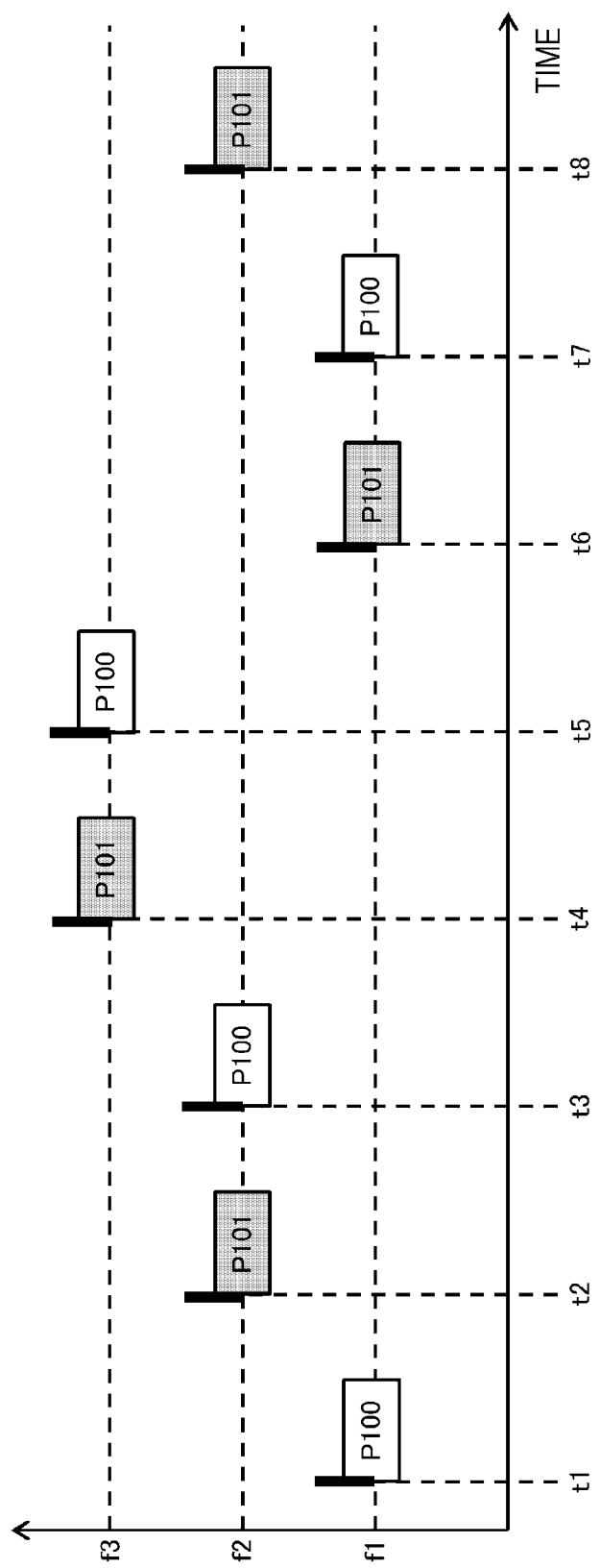

FIG. 14

| RECEPTION LIST | BASE STATION 200 (UPLINK) | | | |
|---|---|---|---|---|
| | DETECTION TIMING | RECEPTION POWER | DETECTION FREQUENCY | RECEPTION RESULT |
| No. 1 | t1 | −65dBm | f1 | OK(100) |
| No. 2 | t2 | −100dBm | f2 | OK(101) |
| No. 3 | t3 | −70dBm | f2 | OK(100) |
| No. 4 | t4 | −95dBm | f3 | OK(101) |
| No. 5 | t5 | −80dBm | f3 | OK(100) |
| No. 6 | t6 | −75dBm | f1 | OK(101) |
| No. 7 | t7 | −90dBm | f1 | OK(100) |
| No. 8 | t8 | −70dBm | f2 | OK(101) |

FIG. 15

| RECEPTION LIST | BASE STATION 201 (UPLINK) | | | |
|---|---|---|---|---|
| | DETECTION TIMING | RECEPTION POWER | DETECTION FREQUENCY | RECEPTION RESULT |
| No. 1 | t1 | −105dBm | f1 | OK(100) |
| No. 2 | t2 | −67dBm | f2 | OK(101) |
| No. 3 | t3 | −100dBm | f2 | OK(100) |
| No. 4 | t4 | −75dBm | f3 | OK(101) |
| No. 5 | t5 | −83dBm | f3 | OK(100) |
| No. 6 | t6 | −90dBm | f1 | OK(101) |
| No. 7 | t7 | −73dBm | f1 | OK(100) |
| No. 8 | t8 | −100dBm | f2 | OK(101) |

FIG. 16

| RECEPTION LIST | COMMON | | BASE STATION 200 (UL) | | BASE STATION 201 (UL) | | Downlink | |
|---|---|---|---|---|---|---|---|---|
| | DETECTION Timing | DETECTION FREQUENCY | RECEPTION POWER | RECEPTION RESULT | RECEPTION POWER | RECEPTION RESULT | PREDICTED TRANSMISSION PERIOD (Start, End) | TRANSMISSION FREQUENCY |
| No. 1 | t1 | f1 | −65dBm | OK(100) | −105dBm | OK(100) | (t1+Period, t1+Period+T_DL) | f1 |
| No. 2 | t2 | f2 | −100dBm | OK(101) | −67dBm | OK(101) | (t2+Period, t2+Period+T_DL) | f2 |
| No. 3 | t3 | f2 | −70dBm | OK(100) | −100dBm | OK(100) | (t3+Period, t3+Period+T_DL) | f2 |
| No. 4 | t4 | f3 | −95dBm | OK(101) | −75dBm | OK(101) | (t4+Period, t4+Period+T_DL) | f3 |
| No. 5 | t5 | f3 | −80dBm | OK(100) | −83dBm | OK(100) | (t5+Period, t5+Period+T_DL) | f3 |
| No. 6 | t6 | f1 | −75dBm | OK(101) | −90dBm | OK(101) | (t6+Period, t6+Period+T_DL) | f1 |
| No. 7 | t7 | f1 | −90dBm | OK(100) | −73dBm | OK(100) | (t7+Period, t7+Period+T_DL) | f1 |
| No. 8 | t8 | f2 | −70dBm | OK(101) | −100dBm | OK(101) | (t8+Period, t8+Period+T_DL) | f2 |

FIG. 17

| RECEPTION LIST | COMMON | | BASE STATION 200 (UL) | | BASE STATION 201 (UL) | | Downlink | |
|---|---|---|---|---|---|---|---|---|
| | DETECTION Timing | DETECTION FREQUENCY | RECEPTION POWER | RECEPTION RESULT | RECEPTION POWER | RECEPTION RESULT | PREDICTED TRANSMISSION PERIOD (Start, End) | TRANSMISSION FREQUENCY |
| No. 1 | t1 | f1 | −65dBm | OK(100) | −105dBm | OK(100) | (t1+Period, t1+Period+T_DL) | f1 |
| No. 2 | t2 | f2 | −100dBm | OK(101) | −67dBm | OK(101) | (t2+Period, t2+Period+T_DL) | f2 |
| No. 3 | t3 | f2 | −70dBm | OK(100) | −100dBm | OK(100) | (t3+Period, t3+Period+T_DL) | f2 |
| No. 4 | t4 | f3 | −95dBm | OK(101) | −75dBm | OK(101) | (t4+Period, t4+Period+T_DL) | f3 |
| No. 5 | t5 | f3 | −80dBm | OK(100) | −83dBm | OK(100) | (t5+Period, t5+Period+T_DL) | f3 |
| No. 6 | t6 | f1 | −75dBm | OK(101) | −90dBm | OK(101) | (t6+Period, t6+Period+T_DL) | f1 |
| No. 7 | t7 | f1 | −90dBm | OK(100) | −73dBm | OK(100) | (t7+Period, t7+Period+T_DL) | f1 |
| No. 8 | t8 | f2 | −70dBm | OK(101) | −100dBm | OK(101) | (t8+Period, t8+Period+T_DL) | f2 |

FIG. 18

Downlink

| RECEPTION LIST | COMMON | | BASE STATION 200 (UL) | | BASE STATION 201 (UL) | | PREDICTED TRANSMISSION PERIOD (Start, End) | TRANSMISSION FREQUENCY | TRANSMISSION BASE STATION |
|---|---|---|---|---|---|---|---|---|---|
| | DETECTION Timing | DETECTION FREQUENCY | RECEPTION POWER | RECEPTION RESULT | RECEPTION POWER | RECEPTION RESULT | | | |
| No. 2 | t2 | f2 | −100dBm | OK(101) | −67dBm | OK(101) | (t2+Period, t2+Period+T_DL) | f2 | BASE STATION 201 (TERMINAL 101) |
| No. 3 | t3 | f2 | −70dBm | OK(100) | −100dBm | OK(100) | (t3+Period, t3+Period+T_DL) | f2 | |

Downlink

| RECEPTION LIST | COMMON | | BASE STATION 200 (UL) | | BASE STATION 201 (UL) | | PREDICTED TRANSMISSION PERIOD (Start, End) | TRANSMISSION FREQUENCY | TRANSMISSION BASE STATION |
|---|---|---|---|---|---|---|---|---|---|
| | DETECTION Timing | DETECTION FREQUENCY | RECEPTION POWER | RECEPTION RESULT | RECEPTION POWER | RECEPTION RESULT | | | |
| No. 2 | t2 | f2 | −100dBm | OK(101) | −67dBm | OK(101) | (t2+Period, t2+Period+T_DL) | f2 | BASE STATION 201 (TERMINAL 101) |
| No. 3 | t3 | f2 | −70dBm | OK(100) | −100dBm | OK(100) | (t3+Period, t3+Period+T_DL) | f2 | |

Downlink

| RECEPTION LIST | COMMON | | BASE STATION 200 (UL) | | BASE STATION 201 (UL) | | PREDICTED TRANSMISSION PERIOD (Start, End) | TRANSMISSION FREQUENCY | TRANSMISSION BASE STATION |
|---|---|---|---|---|---|---|---|---|---|
| | DETECTION Timing | DETECTION FREQUENCY | RECEPTION POWER | RECEPTION RESULT | RECEPTION POWER | RECEPTION RESULT | | | |
| No. 2 | t2 | f2 | −100dBm | OK(101) | −67dBm | OK(101) | (t2+Period, t2+Period+T_DL) | f2 | BASE STATION 201 (TERMINAL 101) |
| No. 3 | t3 | f2 | −70dBm | OK(100) | −100dBm | OK(100) | (t3+Period, t3+Period+T_DL) | f2 | BASE STATION 200 (TERMINAL 100) |

FIG. 19

| RECEPTION LIST | COMMON | | BASE STATION 200 (UL) | | BASE STATION 201 (UL) | | Downlink | | |
|---|---|---|---|---|---|---|---|---|---|
| | DETECTION Timing | DETECTION FREQUENCY | RECEPTION POWER | RECEPTION RESULT | RECEPTION POWER | RECEPTION RESULT | PREDICTED TRANSMISSION PERIOD (Start, End) | TRANSMISSION FREQUENCY | TRANSMISSION BASE STATION |
| No. 1 | t1 | f1 | −65dBm | OK(100) | −105dBm | OK(100) | (t1+Period, t1+Period+T_DL) | f1 | BASE STATION 200 (TERMINAL 100) |
| No. 2 | t2 | f2 | −100dBm | OK(101) | −67dBm | OK(101) | (t2+Period, t2+Period+T_DL) | f2 | BASE STATION 201 (TERMINAL 101) |
| No. 3 | t3 | f2 | −70dBm | OK(100) | −100dBm | OK(100) | (t3+Period, t3+Period+T_DL) | f2 | BASE STATION 200 (TERMINAL 100) |
| No. 4 | t4 | f3 | −95dBm | OK(101) | −75dBm | OK(101) | (t4+Period, t4+Period+T_DL) | f3 | BASE STATION 201 (TERMINAL 101) |
| No. 5 | t5 | f3 | −80dBm | OK(100) | −83dBm | OK(100) | (t5+Period, t5+Period+T_DL) | f3 | BASE STATION 200 (TERMINAL 100) |
| No. 6 | t6 | f1 | −75dBm | OK(101) | −90dBm | OK(101) | (t6+Period, t6+Period+T_DL) | f1 | BASE STATION 201 (TERMINAL 101) |
| No. 7 | t7 | f1 | −90dBm | OK(100) | −73dBm | OK(100) | (t7+Period, t7+Period+T_DL) | f1 | BASE STATION 200 (TERMINAL 100) |
| No. 8 | t8 | f2 | −70dBm | OK(101) | −100dBm | OK(101) | (t8+Period, t8+Period+T_DL) | f2 | BASE STATION 201 (TERMINAL 101) |

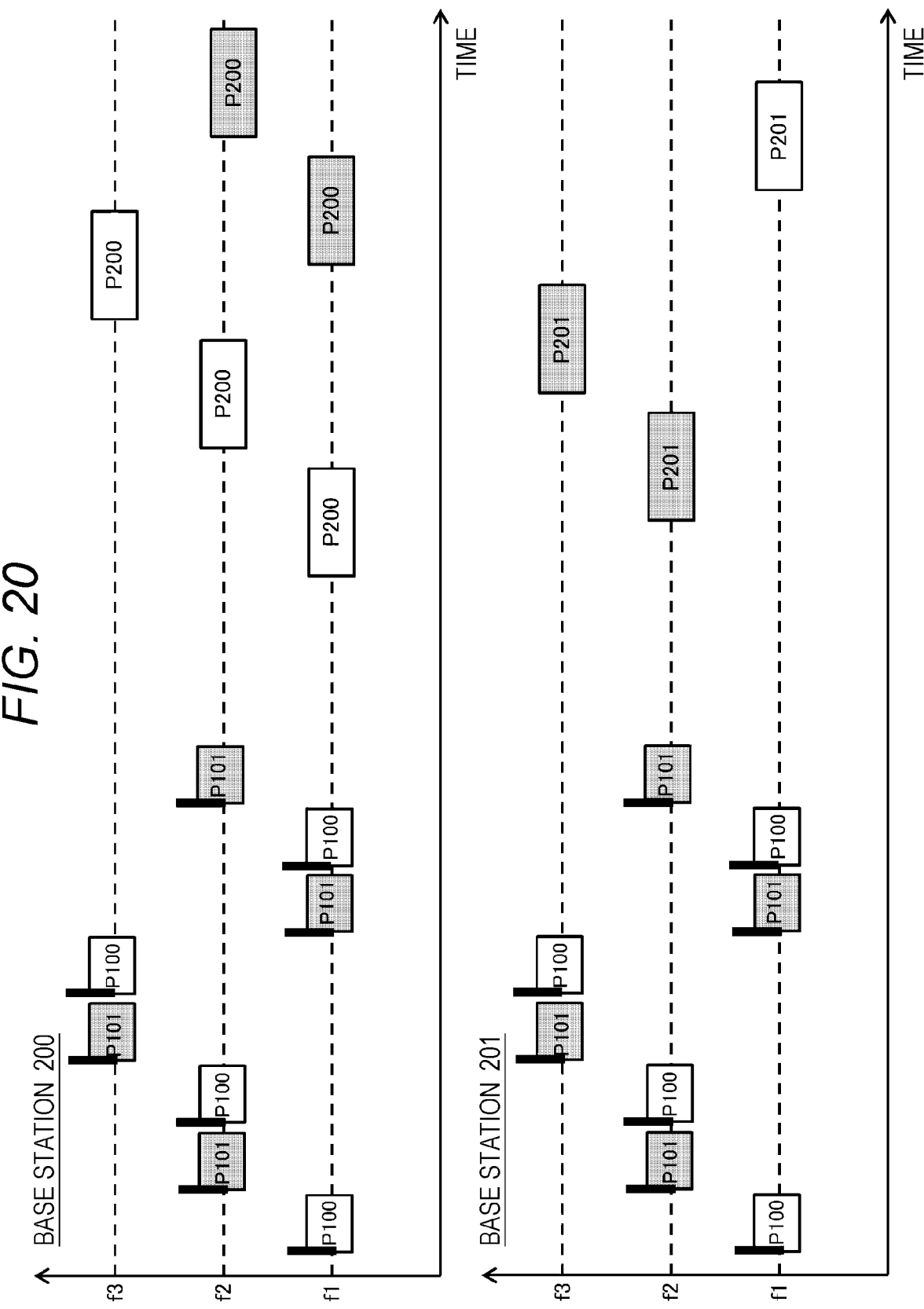

FIG. 29

| RECEPTION LIST | COMMON | | BASE STATION 200 (UL) | | BASE STATION 201 (UL) | | Downlink | |
|---|---|---|---|---|---|---|---|---|
| | DETECTION Timing | DETECTION FREQUENCY | RECEPTION POWER | RECEPTION RESULT | RECEPTION POWER | RECEPTION RESULT | PREDICTED TRANSMISSION PERIOD (Start, End) | TRANSMISSION FREQUENCY |
| No. 1 | t1 | f1 | −65dBm | OK(100) | −105dBm | NG(—) | (t1+Period, t1+Period+T_DL) | f1 |
| No. 2 | t2 | f2 | −100dBm | OK(101) | −67dBm | NG(—) | (t2+Period, t2+Period+T_DL) | f2 |
| No. 3 | t3 | f2 | −70dBm | OK(100) | −100dBm | NG(—) | (t3+Period, t3+Period+T_DL) | f2 |
| No. 4 | t4 | f3 | −95dBm | OK(101) | −75dBm | NG(—) | (t4+Period, t4+Period+T_DL) | f3 |
| No. 5 | t5 | f3 | −80dBm | OK(100) | −83dBm | NG(—) | (t5+Period, t5+Period+T_DL) | f3 |
| No. 6 | t6 | f1 | −75dBm | OK(101) | −90dBm | NG(—) | (t6+Period, t6+Period+T_DL) | f1 |
| No. 7 | t7 | f1 | −90dBm | OK(100) | −73dBm | NG(—) | (t7+Period, t7+Period+T_DL) | f1 |
| No. 8 | t8 | f2 | −70dBm | OK(101) | −100dBm | NG(—) | (t8+Period, t8+Period+T_DL) | f2 |

FIG. 30

| RECEPTION LIST | COMMON | | BASE STATION 200 (UL) | | BASE STATION 201 (UL) | | Downlink | | |
|---|---|---|---|---|---|---|---|---|---|
| | DETECTION Timing | DETECTION FREQUENCY | RECEPTION POWER | RECEPTION RESULT | RECEPTION POWER | RECEPTION RESULT | PREDICTED TRANSMISSION PERIOD (Start, End) | TRANSMISSION FREQUENCY | TRANSMISSION BASE STATION |
| No. 1 | t1 | f1 | −65dBm | OK(100) | −105dBm | NG(---) | (t1+Period, t1+Period+T_DL) | f1 | BASE STATION 200 (TERMINAL 100) |
| No. 2 | t2 | f2 | −100dBm | OK(101) | −67dBm | NG(---) | (t2+Period, t2+Period+T_DL) | f2 | BASE STATION 201 (TERMINAL 101) |
| No. 3 | t3 | f2 | −70dBm | OK(100) | −100dBm | NG(---) | (t3+Period, t3+Period+T_DL) | f2 | BASE STATION 200 (TERMINAL 100) |
| No. 4 | t4 | f3 | −95dBm | OK(101) | −75dBm | NG(---) | (t4+Period, t4+Period+T_DL) | f3 | BASE STATION 201 (TERMINAL 101) |
| No. 5 | t5 | f3 | −80dBm | OK(100) | −83dBm | NG(---) | (t5+Period, t5+Period+T_DL) | f3 | BASE STATION 200 (TERMINAL 100) |
| No. 6 | t6 | f1 | −75dBm | OK(101) | −90dBm | NG(---) | (t6+Period, t6+Period+T_DL) | f1 | BASE STATION 201 (TERMINAL 101) |
| No. 7 | t7 | f1 | −90dBm | OK(100) | −73dBm | NG(---) | (t7+Period, t7+Period+T_DL) | f1 | BASE STATION 200 (TERMINAL 100) |
| No. 8 | t8 | f2 | −70dBm | OK(101) | −100dBm | NG(---) | (t8+Period, t8+Period+T_DL) | f2 | BASE STATION 201 (TERMINAL 101) |

FIG. 31

| RECEPTION LIST | COMMON | | BASE STATION 200 (UL) | | BASE STATION 201 (UL) | | Downlink | | |
|---|---|---|---|---|---|---|---|---|---|
| | DETECTION Timing | DETECTION FREQUENCY | RECEPTION POWER | RECEPTION RESULT | RECEPTION POWER | RECEPTION RESULT | PREDICTED TRANSMISSION PERIOD (Start, End) | TRANSMISSION FREQUENCY | TRANSMISSION BASE STATION |
| No. 2 | t2 | f2 | −100dBm | OK(101) | −67dBm | NG(---) | (t2+Period, t2+Period+T_DL) | f2 | BASE STATION 201 (TERMINAL 101) |
| No. 3 | t3 | f2 | −70dBm | OK(100) | −100dBm | NG(---) | (t3+Period, t3+Period+T_DL) | f2 | |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/017096 filed on Apr. 20, 2020, which claims priority benefit of Japanese Patent Application No. JP 2019-103498 filed in the Japan Patent Office on Jun. 3, 2019. Each of the above-referenced applications is hereby incorporated herein by reference in its entirety.

TECHNICAL FIELD

A technology disclosed in the present specification relates to an information processing device and an information processing method that perform processing related to long-distance transmission and bidirectional communication between a plurality of terminals and a plurality of base stations.

BACKGROUND ART

The Internet of Things (IoT) field is expected to generate new value by acquiring and analyzing information from various objects. Although there are various requirements for the IoT, expectations for long-distance transmission are particularly high. This is because information can be acquired from a farther object by long-distance transmission, and a smaller number of base stations support a large number of terminals, such that cost reduction of an entire wireless system can be expected.

As a technology for implementing the long-distance transmission, repetitive transmission has attracted attention. It is possible to improve resistance to fluctuation of a propagation path by transmitting the same data a plurality of times in uplink communication from a terminal to a base station. In addition, the base station combines the same pieces of data obtained by a plurality of times of transmission to improve a signal-to-noise ratio (S/N ratio), thereby implementing long-distance communication.

On the other hand, there is also an application that requires downlink communication from a base station to a terminal. For example, there is an application in which some kind of instruction (for example, causing an LED to illuminate) is transmitted to a terminal according to information reported from the terminal. In addition, there is also an application such as an acknowledgement indicating that the base station was able to correctly acquire information. Furthermore, in addition to the long-distance transmission, low power consumption of the terminal is also required.

In a conventional communication system such as a mobile phone or a wireless local area network (LAN), a terminal receives a control frame or a beacon frame periodically transmitted by a base station, transmits and receives control information to and from the base station, and then transmits data. However, in the IoT field in which data with a small size such as sensor data is handled, transmission and reception of the control frame becomes overhead, and it is difficult to reduce power consumption of the terminal.

For this reason, as a method for implementing bidirectional communication supporting uplink and downlink, a communication method in which downlink reception is performed after a certain period of time elapses from when a terminal performs uplink transmission is often adopted (see, for example, Non-Patent Document 1).

CITATION LIST

Non-Patent Document

Non-Patent Document 1: http://www.soumu.go.jp/main_content/000450875.pdf (Jun. 3, 2019)

SUMMARY OF THE INVENTION

Problems to be Solved by the Invention

An object of the technology disclosed in the present specification is to provide an information processing device and an information processing method that implements long-distance transmission and bidirectional communication between a terminal and a base station while achieving low power consumption of the terminal.

Solutions to Problems

The technology disclosed in the present specification has been made in view of the above-described problems, and a first aspect thereof is an information processing device including:

a collection unit that collects each piece of reception information of a plurality of base stations that receives an uplink frame from a terminal; and a processing unit that processes cooperative transmission of a downlink frame from the plurality of base stations to the terminal on the basis of the reception information.

The information processing device according to the first aspect implements cooperative transmission of a downlink frame performed by a plurality of base stations in a wireless system in which, after repetitive uplink frame transmission is performed by using a plurality of frequencies, a downlink frame is performed at the same frequency after a certain period of time elapses from a detection timing of the uplink frame at each frequency.

The collection unit collects the reception information in which a detection timing, reception power, a detection frequency, and a reception result of each received uplink frame of each of the plurality of base stations are described. Further, the processing unit determines a predicted transmission period and a transmission frequency of a downlink frame corresponding to each uplink frame on the basis of the detection timing and the detection frequency of each uplink frame, and in a case where two or more downlink frames are transmitted in an overlapping manner at the same frequency and the same time, the processing unit determines a base station that transmits each downlink frame on the basis of the reception power of the uplink frame corresponding to each downlink frame.

Furthermore, a second aspect of the technology disclosed in the present specification is an information processing method including:

a collection step of collecting each piece of reception information of a plurality of base stations that receives an uplink frame from a terminal; and a processing step of processing cooperative transmission of a downlink frame from the plurality of base stations to the terminal on the basis of the reception information.

Effects of the Invention

According to the technology disclosed in the present specification, it is possible to provide an information processing device and an information processing method that perform cooperative processing between base stations for implementing long-distance transmission and bidirectional communication between a terminal and a base station while achieving low power consumption of the terminal by cooperative transmission performed by a plurality of base stations.

Note that the effects described in the present specification are merely examples, and the effects achieved by the technology disclosed in the present specification are not limited thereto. Furthermore, the technology disclosed in the present specification may further exhibit additional effects in addition to the above effects.

Still other objects, features, and advantages of the technology disclosed in the present specification will become apparent by a more detailed description based on embodiments as described later and accompanying drawings.

BRIEF DESCRIPTION OF DRAWINGS

FIG. 13 is a diagram illustrating an operation example in which the base station 200 receives the uplink wireless frames from the terminals 100 and 101.

FIG. 14 is a diagram illustrating a reception list of the base station 200 in a reception situation illustrated in FIG. 13.

FIG. 15 is a diagram illustrating a reception list of a base station 201 in the reception situation illustrated in FIG. 13.

FIG. 16 is a diagram illustrating a combined reception list created from the reception lists illustrated in FIGS. 14 and 15.

FIG. 17 is a diagram illustrating an example of specifying a contention group from the combined reception list illustrated in FIG. 16.

FIG. 18 is a diagram illustrating a state in which cooperative processing is performed on the contention group.

FIG. 19 is a diagram illustrating a result of performing cooperative processing on all contention groups.

FIG. 20 is a diagram illustrating a state in which each of the base station 200 and the base station 201 transmits a downlink wireless frame designated by a server 300.

FIG. 29 is a diagram illustrating another configuration example (second embodiment) of the combined reception list.

FIG. 30 is a diagram illustrating a result of performing cooperative processing on the basis of the combined reception list illustrated in FIG. 29.

FIG. 31 is a diagram illustrating a state in which the cooperative processing is performed on contention group 2 including entry numbers No. 2 and No. 3 in the combined reception list illustrated in FIG. 29.

MODE FOR CARRYING OUT THE INVENTION

Figure 1:
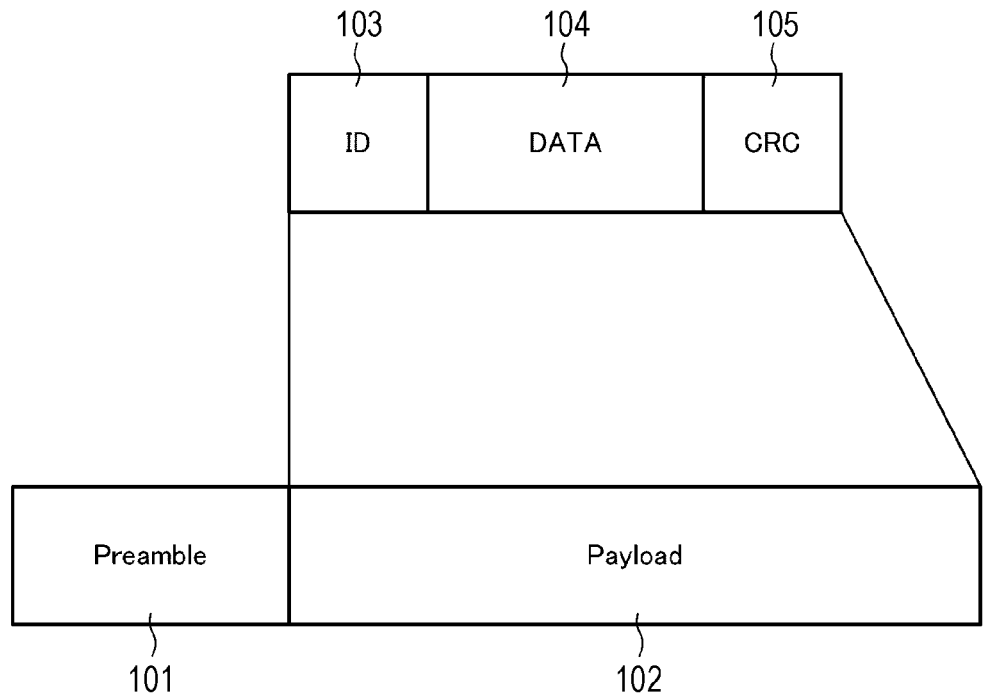
FIG. 1 is a diagram illustrating a configuration example of an uplink wireless frame.

Hereinafter, embodiments of the technology disclosed in the present specification will be described in detail with reference to the drawings.

In the IoT field and the like, long-distance transmission is implemented by repetitive transmission in uplink communication from a terminal to a base station (as described above), but it is necessary to implement long-distance transmission also in downlink communication. For example, the following two methods can be mentioned as a method of implementing the long-distance transmission in downlink.

(A) Increasing transmission power of the base station.

(B) Performing the repetitive transmission as in uplink.

In the former method (A) of increasing the transmission power of the base station, an upper limit of the transmission power is specified by the laws and regulations of each country, and once the transmission power is increased, the base station is no longer a specific low-power wireless station that can be used without a license, and the base station becomes a registered station or a licensed station that needs an administrator, which causes an operational restriction. Therefore, it is difficult to say that it is a realistic implementation method.

In addition, in the latter method (B), since the base station needs to perform communication with a plurality of terminals, there is a problem that wireless resources are occupied by the repetitive transmission. It takes a long time to perform repetitive transmission to one terminal, and during this time, transmission to other terminals cannot be performed. In addition, since the terminal is required to be manufactured at a low cost, reception sensitivity is lower than that of the base station.

For example, a noise figure (NF), which is one factor that determines the reception sensitivity, may be several dB lower than that of the base station. Assuming that the reception sensitivity is lower by 3 dB, and assuming that the transmission power is the same and the number of times the repetitive transmission is performed is the same, a wireless frame length in downlink needs to be doubled or more in order to achieve the same reception sensitivity in uplink and downlink. Therefore, wireless resources of the base station are further tightened.

In the present specification, a technology for implementing long-distance transmission in downlink by repetitive transmission is proposed below. A problem of wireless resource occupation due to transmission to a specific terminal in a base station is solved while achieving the long-distance transmission by cooperative transmission in which downlink repetitive transmission is shared by a plurality of base stations.

First Embodiment

A first embodiment will be described in the following order.

A. Repetitive Transmission Method and Repetitive Reception Method in Uplink

B. Repetitive Transmission Method and Repetitive Reception Method in Downlink

C. Wireless Resource Shortage in Base Station

D. Method of Cooperative Transmission between Base Stations

A. Repetitive Transmission Method and Repetitive Reception Method in Uplink

The terminal transmits sensor data periodically or in a case where a change occurs in an output of a sensor. The sensor data is stored in an uplink wireless frame and transmitted to the base station. FIG. 1 illustrates a configuration example of the uplink wireless frame. The illustrated wireless frame includes a preamble 101 and a payload 102.

The preamble 101 includes a unique pattern determined in advance in a wireless system. A reception side (for example, the base station) can detect a strength of a received signal and a reception timing of the wireless frame by calculating a correlation between the unique pattern of the preamble and the received signal.

The payload 102 includes an ID field 103, a DATA field 104, and a cyclic redundancy code (CRC) field 105.

The ID field 103 stores an identifier (terminal ID) of the terminal that transmits the uplink wireless frame. In addition, the DATA field 104 stores transmitted data such as sensor data.

The CRC field 105 stores a value of a cyclic redundancy code calculated on the basis of a value stored in each of the ID field 103 and the DATA field 104.

The payload 102 is obtained by performing signal processing for improving error resilience in a transmission path on a bit sequence including an ID, DATA, and CRC. Examples of the signal processing generally include forward error correction (FEC) and bit order rearrangement (interleaving). The forward error correction is processing of improving error correction by adding redundant bits to an input bit sequence. The error resilience capability is increased according to a length of the redundant bits. Therefore, by the above-described signal processing, a length of the payload 102 becomes larger than the sum of the original data (ID, DATA, and CRC).

Note that a downlink wireless frame transmitted from the base station to the terminal also has the same frame configuration as the uplink wireless frame illustrated in FIG. 1. However, in order to obtain the reception sensitivity equivalent to that of the base station in the terminal manufactured at a low cost, a length of redundant bits for the forward error correction becomes longer, such that the frame length becomes longer than that of the uplink wireless frame.

Subsequently, a method for detecting the uplink wireless frame illustrated in FIG. 1 on the reception side will be described. As described above, the wireless frame is detected by calculating the correlation between the unique pattern of the preamble and the received signal.

Figure 2:
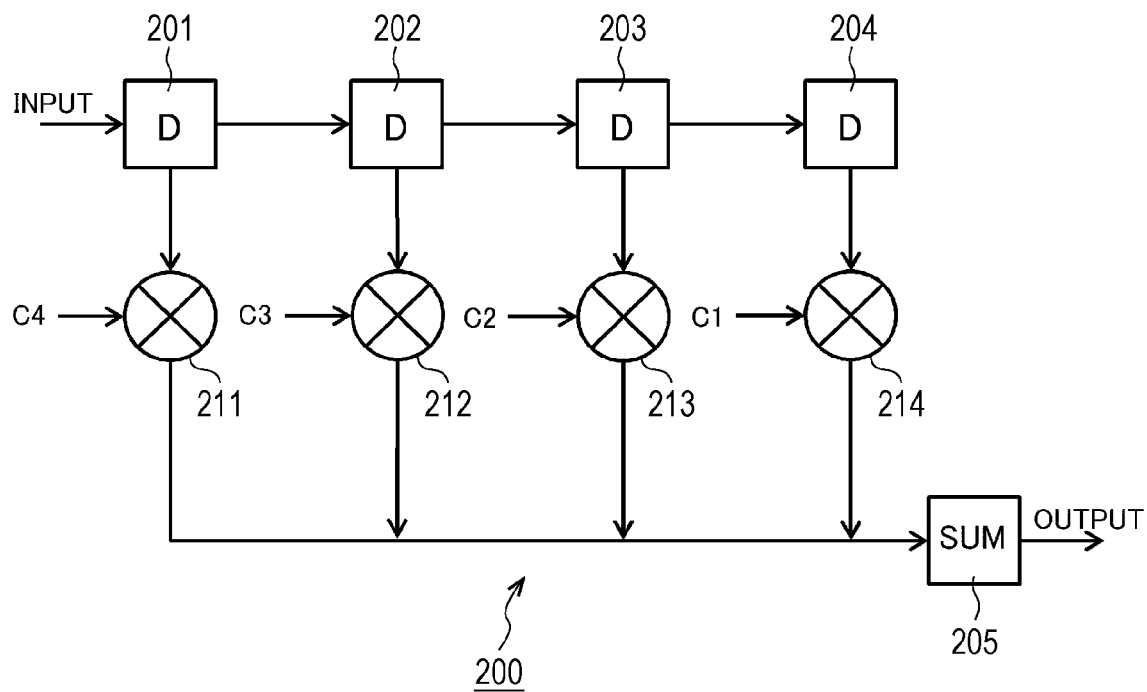
FIG. 2 is a diagram illustrating a block diagram of a correlation calculator 200.

FIG. 2 illustrates a block diagram of a correlation calculator 200. "INPUT" is a received signal (however, after digital conversion). The received signal is sequentially input to delay elements (in FIG. 10, blocks denoted by "D") 201 to 204 that perform one-sample delay for each sample. In FIG. 2, a bit sequence including C4, C3, C2, and C1 is a known preamble pattern. Multipliers 211 to 214 multiply outputs of the respective delay elements 201 to 204 by C4, C3, C2, and C1, respectively, and addition of the multiplication results is calculated in an addition block 205 denoted by "SUM" in FIG. 2. Further, "OUTPUT" is a correlation value between the unique pattern of the preamble and the received signal. Although FIG. 2 illustrates an example in which the preamble has a 4-bit length, the configuration of FIG. 2 can be extended and applied also in a case where a longer preamble pattern is used.

Figures 3, 4:
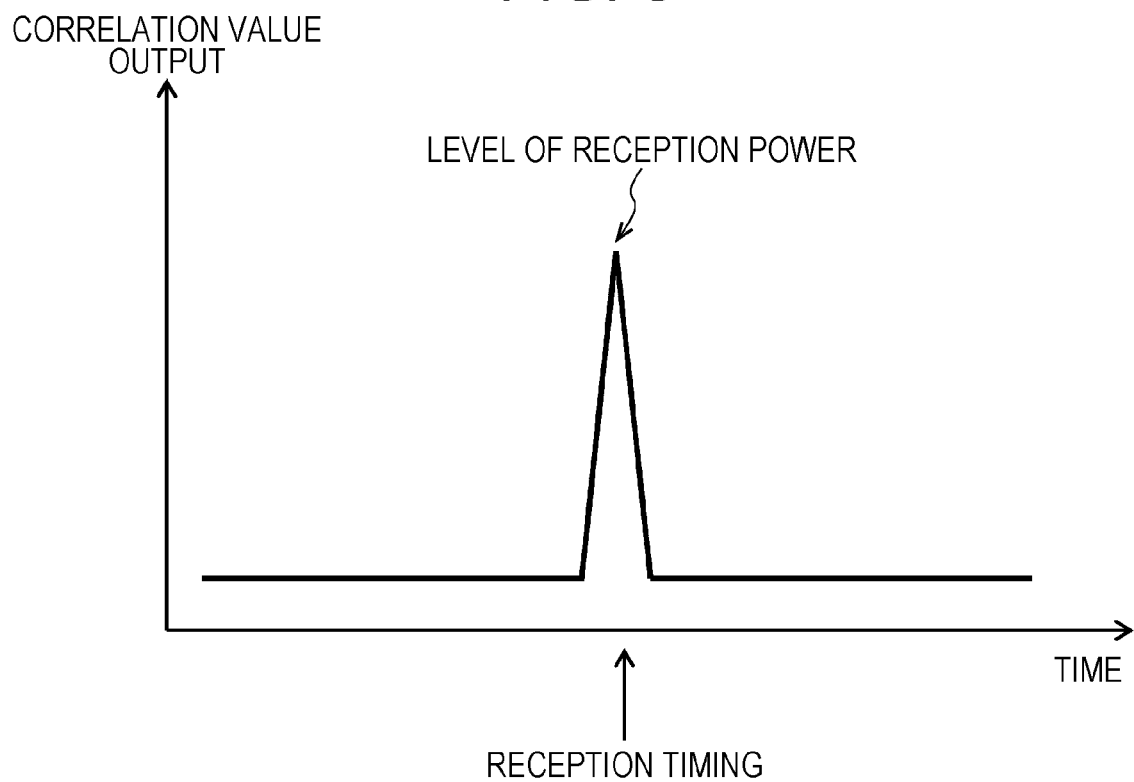
FIG. 3 is a diagram illustrating an image of a correlation value output calculated by a correlation calculator 200.
FIG. 4 is a diagram illustrating three examples of uplink wireless frame transmission patterns.

FIG. 3 illustrates an image of a correlation value output calculated by the correlation calculator 200 illustrated in FIG. 2. Note that a horizontal axis is a time axis, and a vertical axis represents the correlation value calculated by the correlation calculator 200 for each time point. The correlation value becomes large at a timing when the received signal matches the known preamble pattern, and becomes small when deviated from the timing. Further, it is possible to detect the wireless frame by setting, as the reception timing of the wireless frame, a time point at which the correlation value output in FIG. 3 peaks. Furthermore, a maximum value of the correlation value output is the level of reception power.

The uplink wireless frame for transmitting the sensor data is configured as in FIG. 1. The terminal transmits the same uplink wireless frame a plurality of times while switching a frequency to be used for each number of repetition. Specifically, a plurality of uplink wireless frame transmission patterns having different frequency switching patterns for each number of repetition is prepared in advance, and the terminal randomly selects any pattern and performs uplink repetitive transmission.

FIG. 4 illustrates three examples of the uplink wireless frame transmission patterns. A transmission time and frequency of the repetitive transmission are specified in each uplink wireless frame transmission pattern. Note that, in the example illustrated in FIG. 4, frequencies f1 to f3 available in the wireless system are illustrated as examples. For example, in a case where uplink wireless frame transmission pattern 1 (P1_UL) is selected, the first transmission is performed at an arbitrary time point (for example, when a transmission request is made at the terminal) and at the frequency f1. The second transmission is performed at a time point after T_UL elapses from the first transmission, and at the frequency f2. The third transmission is performed at a time point after 2×T_UL elapses from the first transmission, and at the frequency f3. The fourth transmission is performed at a time point after 3×T_UL elapses from the first transmission, and at the frequency f1.

Furthermore, in a case where uplink wireless frame transmission pattern 2 (P2_UL) is selected, the first transmission is performed at an arbitrary time point (for example, when a transmission request is made at the terminal) and at the frequency f2. The second transmission is performed at a time point after T_UL elapses from the first transmission, and at the frequency f3. The third transmission is performed at a time point after 2×T_UL elapses from the first transmission, and at the frequency f1. The fourth transmission is performed at a time point after 3×T_UL elapses from the first transmission, and at the frequency f2 again.

Furthermore, in a case where uplink wireless frame transmission pattern 3 (P3_UL) is selected, the first transmission is performed at an arbitrary time point (for example, when a transmission request is made at the terminal) and at the frequency f3. The second transmission is performed at a time point after T_UL elapses from the first transmission, and at the frequency f1. The third transmission is performed at a time point after 2×T_UL elapses from the first transmission, and at the frequency f2. The fourth transmission is performed at a time point after 3×T_UL elapses from the first transmission, and at the frequency f3.

Figure 5:
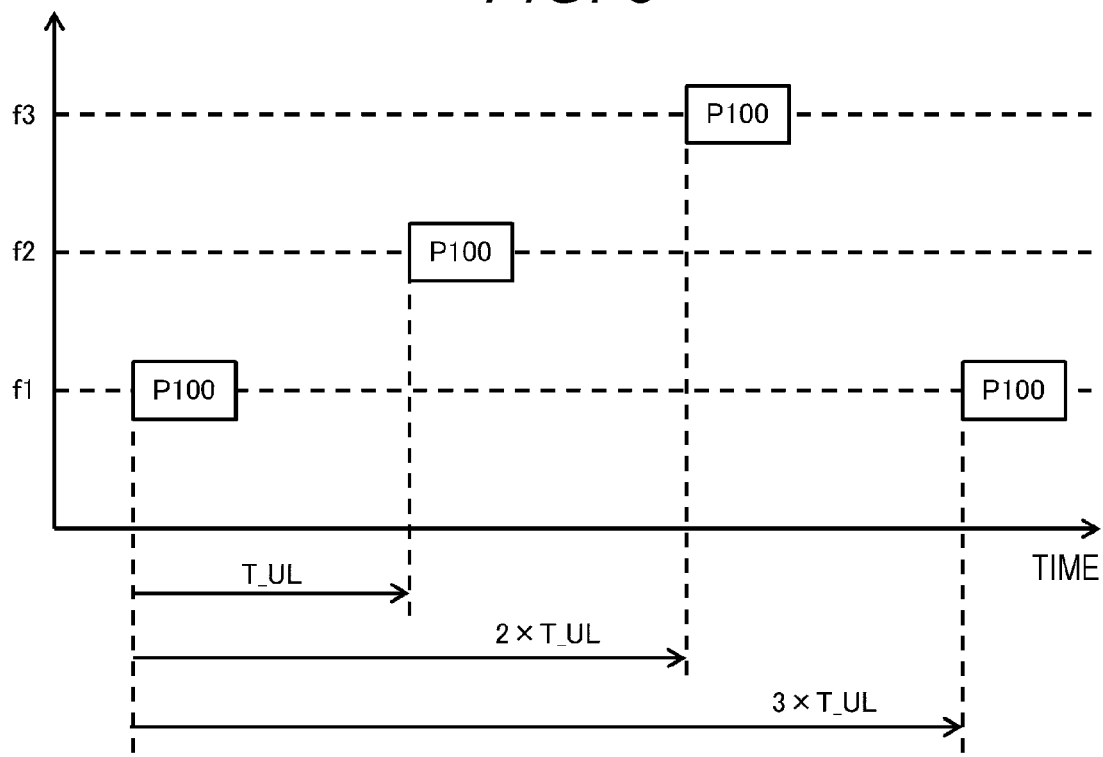
FIG. 5 is a diagram illustrating a transmission operation of a terminal in a case where uplink wireless frame transmission pattern 1 is selected.

FIG. 5 illustrates a transmission operation in a case where the terminal selects uplink wireless frame transmission pattern 1. Note that a horizontal axis is a time axis, and a vertical axis is a frequency axis. A white box denoted by "P100" in FIG. 5 represents an uplink wireless frame repeatedly transmitted by the terminal. The terminal performs the first uplink wireless frame transmission by using the frequency f1 at an arbitrary time point, and then performs the second uplink wireless frame transmission by using the frequency f2 after T_UL elapses, performs the third uplink wireless frame transmission by using the frequency f3 after 2×T_UL elapses, and performs the fourth uplink wireless frame transmission by using the frequency f1 again after 3×T_UL elapses.

Next, a method for receiving the uplink wireless frame repeatedly transmitted from the terminal will be described.

Figure 6:
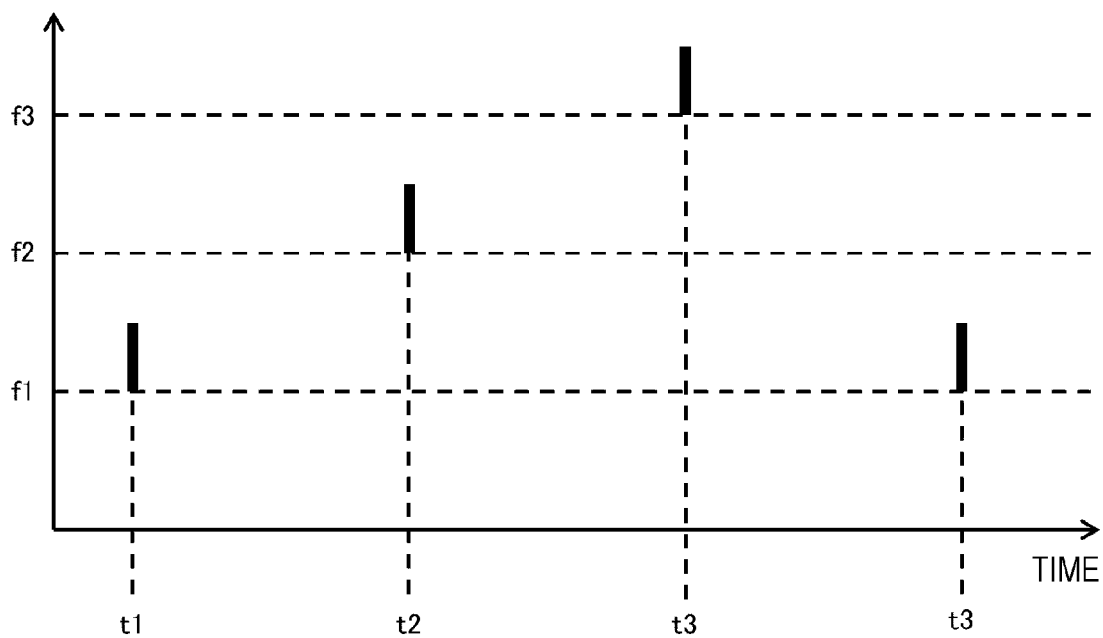
FIG. 6 is a diagram illustrating an example of a frame detection result of a base station.

The base station basically performs the frame detection (described above) by using the preamble on all frequencies used in the wireless system. FIG. 6 illustrates an example of a result of the frame detection performed by the base station. Note that a horizontal axis is a time axis, and a vertical axis is a frequency axis. In FIG. 6, it is assumed that thick lines scattered on the horizontal axis for the respective frequencies f1 to f3 represent detection timings at which the uplink wireless frame is detected by the base station and the strength of the correlation value (received signal) at those timings. Here, it is assumed that the terminal selects uplink wireless frame transmission pattern 1 and performs repetitive transmission (see FIG. 5).

In a case of performing uplink reception, the base station performs pattern matching with each uplink wireless frame transmission pattern on the basis of the detection result as illustrated in FIG. 6, and performs frame combination. In the pattern matching, a frame to be combined is selected from the detection result by using all defined uplink wireless frame transmission patterns (in the above-described example, uplink wireless frame transmission patterns 1 to 3 illustrated in FIG. 4).

In the example illustrated in FIG. 6, the base station detects a frame at the frequency f1 at a time point t1, subsequently detects a frame at the frequency f2 at a time point t2 after T_UL elapses from the time point t1, subsequently detects a frame at the frequency f3 at a time point t3 after 2×T_UL elapses from the time point t1, and further detects a frame at the frequency f1 again at a time point t4 after 3×T_UL elapses from the time point t1.

Figure 7:
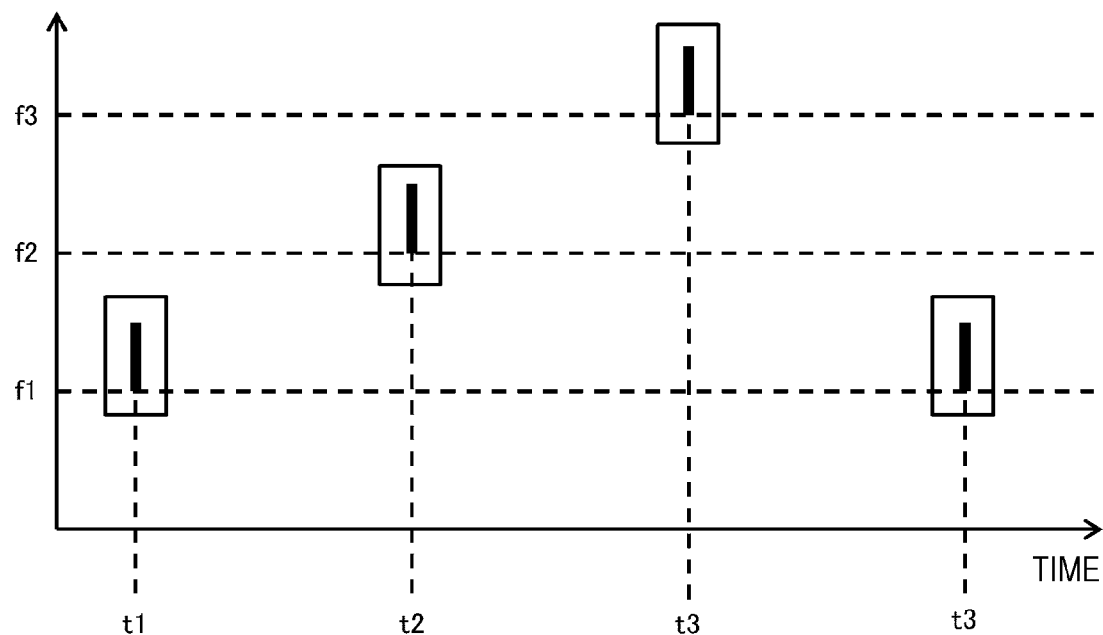
FIG. 7 is a diagram illustrating a result of matching between a frame reception result of the base station and uplink wireless frame transmission pattern 1.
Figure 8:
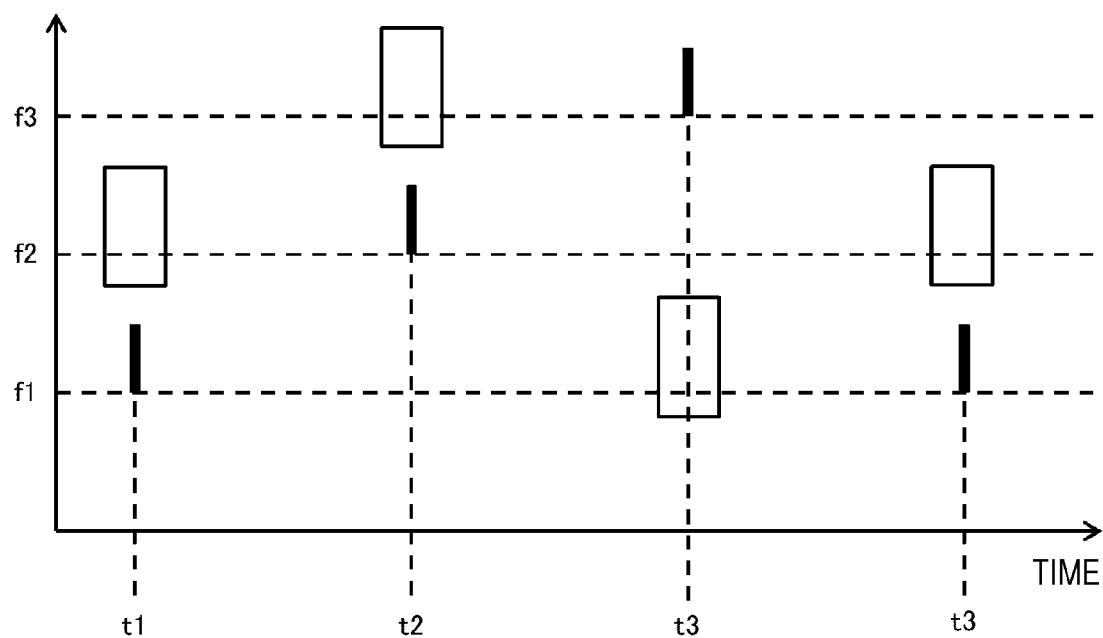
FIG. 8 is a diagram illustrating a result of matching between the frame reception result of the base station and uplink wireless frame transmission pattern 2.
Figure 9:
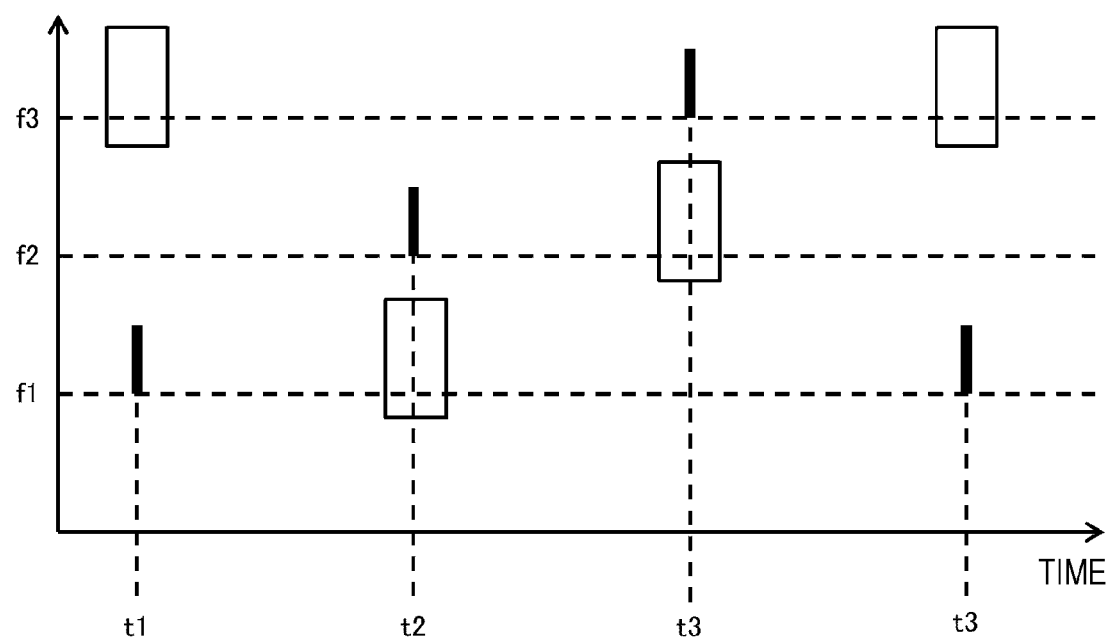
FIG. 9 is a diagram illustrating a result of matching between the frame reception result of the base station and uplink wireless frame transmission pattern 3.

States in which the pattern matching is performed between the detection result illustrated in FIG. 6 and uplink wireless frame transmission pattern 1 to 3 are illustrated in FIGS. 7 to 9, respectively. In each figure, a white frame represents a transmission time and a frequency of repetitive transmission defined by a corresponding uplink wireless frame transmission pattern. Furthermore, in each figure, the detection timing at which the base station has detected the uplink wireless frame is indicated by a thick line. The base station selects any uplink wireless frame transmission pattern on the basis of the frame detection result in the white frame, and performs frame combination. Since the frame detection result illustrated in FIG. 6 matches uplink wireless frame transmission pattern 1 illustrated in FIG. 7 among FIGS. 7 to 9, the base station selects the frame detection results in all white frames in FIG. 7 and performs frame combination. On the other hand, since none of the uplink wireless frame transmission patterns illustrated in FIGS. 8 and 9 matches the frame detection result illustrated in FIG. 6, the frame combination is not performed.

B. Repetitive Transmission Method and Repetitive Reception Method in Downlink

In the wireless system in which uplink repetitive transmission is performed by randomly selecting one of a plurality of uplink wireless frame transmission patterns, as one of methods for implementing downlink while achieving low power consumption of the terminal, a method in which the base station performs downlink transmission by using the same frequency after a certain period of time in a case where uplink has been detected and successfully received is considered.

In uplink, as described in the above-described section A, long-distance communication is implemented by repetitive transmission. For this reason, downlink also requires a method for implementing long-distance communication. In downlink, the terminal performs reception. However, the terminal is generally lower in reception sensitivity than the base station because a processing amount, an analog component, and the like are limited due to cost reduction. Therefore, in order to implement the same communication distance as that of uplink in downlink, it is necessary to adopt repetitive transmission and to lengthen one wireless frame. By lengthening the frame, it is possible to increase energy per bit (alternatively, the forward error correction capability is improved by increasing the length of the redundant bits), such that it is possible to compensate for a decrease in reception sensitivity.

In the present embodiment, it is assumed that the downlink wireless frame has a similar configuration to the uplink wireless frame (see FIG. 1). However, the downlink wireless frame is different from the uplink wireless frame in regard that the wireless frame is lengthened by changing an error correction coding rate and that the ID is a destination terminal ID. In addition, the preamble pattern is different from that of uplink.

Figure 10:
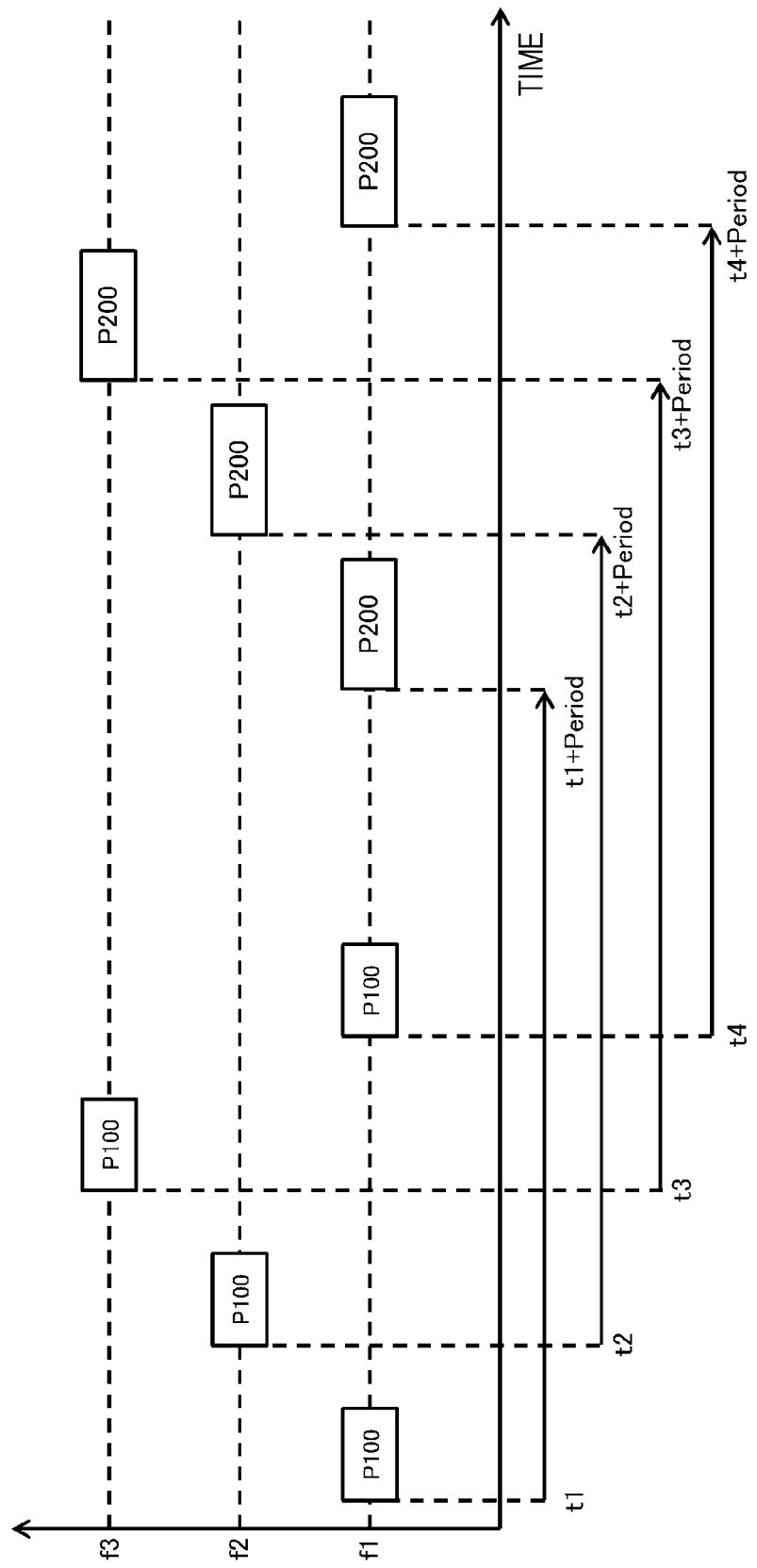
FIG. 10 is a diagram illustrating a downlink transmission operation of the base station.

FIG. 10 illustrates a downlink transmission operation of the base station. Note that a horizontal axis is a time axis, and a vertical axis is a frequency axis. In FIG. 10, a white box denoted by P100 represents an uplink wireless frame repeatedly transmitted by the terminal. In addition, a white box denoted by P200 represents a downlink wireless frame repeatedly transmitted by the base station 200.

The base station basically performs the frame detection (described above) by using the preamble on all frequencies used in the wireless system. Once the uplink wireless frame from the terminal is detected, the base station subsequently selects a frame to be combined by pattern matching. In the example illustrated in FIG. 10, the base station performs combination processing on the frame P100 detected at time points t1, t2, t3, and t4 on a horizontal axis for each of frequencies f1 to f3.

Then, in a case where the frame P100 can be demodulated, the base station transmits the downlink wireless frame P200 after a certain period of time (referred to as "Period") elapses from an uplink frame detection timing at each of the frequencies f1 to f3. The example illustrated in FIG. 10 illustrates a state in which the base station performs downlink transmission at the same frequency as the frequency detected in uplink. That is, the base station performs downlink transmission of the frame P100 by using the same frequency f1 at a time point t1+Period after Period elapses from the time point t1 at which the uplink wireless frame P200 is detected at the frequency f1. Similarly, downlink repetitive transmission of the frame P100 is performed by using each of the frequencies f2, f3, and f1 at each of time points t2+Period, t3+Period, and t4+Period after Period elapses from each of the time points t2, t3, and t4 at which the uplink wireless frame P200 is received at the same frequencies f2, f3, and f1. However, the base station may perform downlink transmission at a frequency different from the frequency detected in uplink according to a predetermined rule. For example, a rule in which a frequency number used for uplink transmission is +1 is considered.

Downlink reception is performed by the terminal. Since the terminal knows a transmission frequency used in uplink, the terminal knows in advance a frequency at which downlink reception is to be performed from the frequency. In addition, since it is known in advance that downlink transmission is performed after a certain period of time (Period) elapses from a transmission time point, the terminal can perform the reception operation after narrowing down the frequency and time, which can contribute to reduction in power consumption.

C. Wireless Resource Shortage in Base Station

In the above-described sections A and B, for the sake of simplicity, the method of performing uplink repetitive transmission and downlink transmission between one base station and one terminal has been described. An actual wireless system includes a plurality of terminals and a plurality of base stations.

Figure 11:
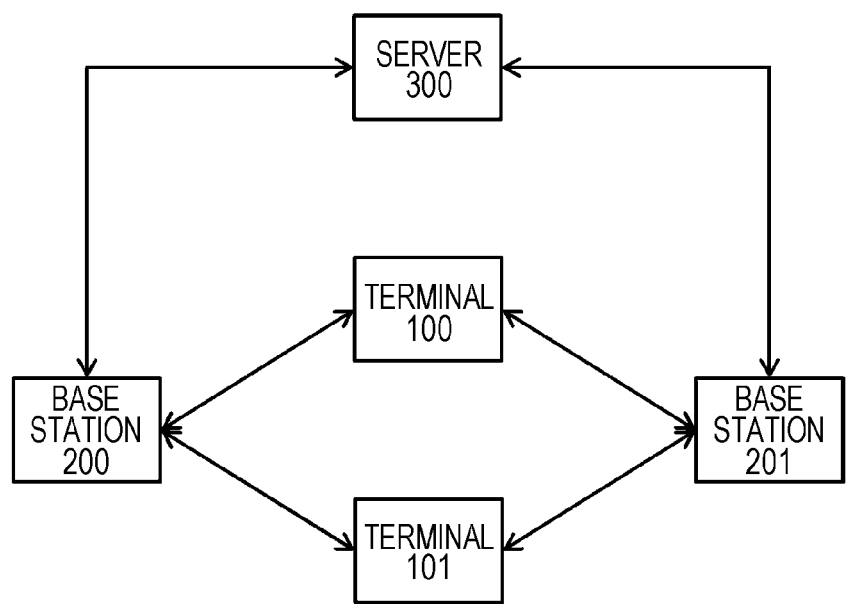
FIG. 11 is a diagram illustrating a configuration example of a wireless system.

FIG. 11 schematically illustrates a configuration example of a wireless system including two base stations 200 and 201, two terminals 100 and 101, and a server 300. The base stations 200 and 201 and the terminals 100 and 101 are connected using a wireless technology. A connection form between the base stations 200 and 201 and the server 300 is not particularly limited, and may be either a wired or wireless technology. The base stations 200 and 201 and the server 300 may be connected using, for example, a general Internet line, long term evolution (LTE), or a wired or wireless LAN.

Each of the terminals 100 and 101 transmits sensor data periodically or in a case where a change occurs in an output of a sensor. An uplink wireless frame transmitted by each of the terminals 100 and 101 is received by at least one of the base stations 200 and 201. In addition, the base stations 200 and 201 demodulate the uplink wireless frames received from the terminals 100 and 101, and transmit the extracted sensor data to the server 300. Then, services such as data analysis and information provision to the user are performed in the server 300.

Subsequently, problems in uplink and downlink in a case of using repetitive transmission will be described.

First, there is a problem in a case where the same terminal performs uplink transmission with respect to a plurality of base stations. Specifically, it is assumed that the uplink wireless frame transmitted by the terminal 100 is received by both the base stations 200 and 201. The base station 200 and the base station 201 perform downlink transmission as illustrated in FIG. 10. In this case, in a case where the downlink repetitive transmission to the terminal 100 is performed by both the base stations 200 and 201, the terminal 100 cannot receive the downlink wireless frame due to mutual interference.

Figure 12:
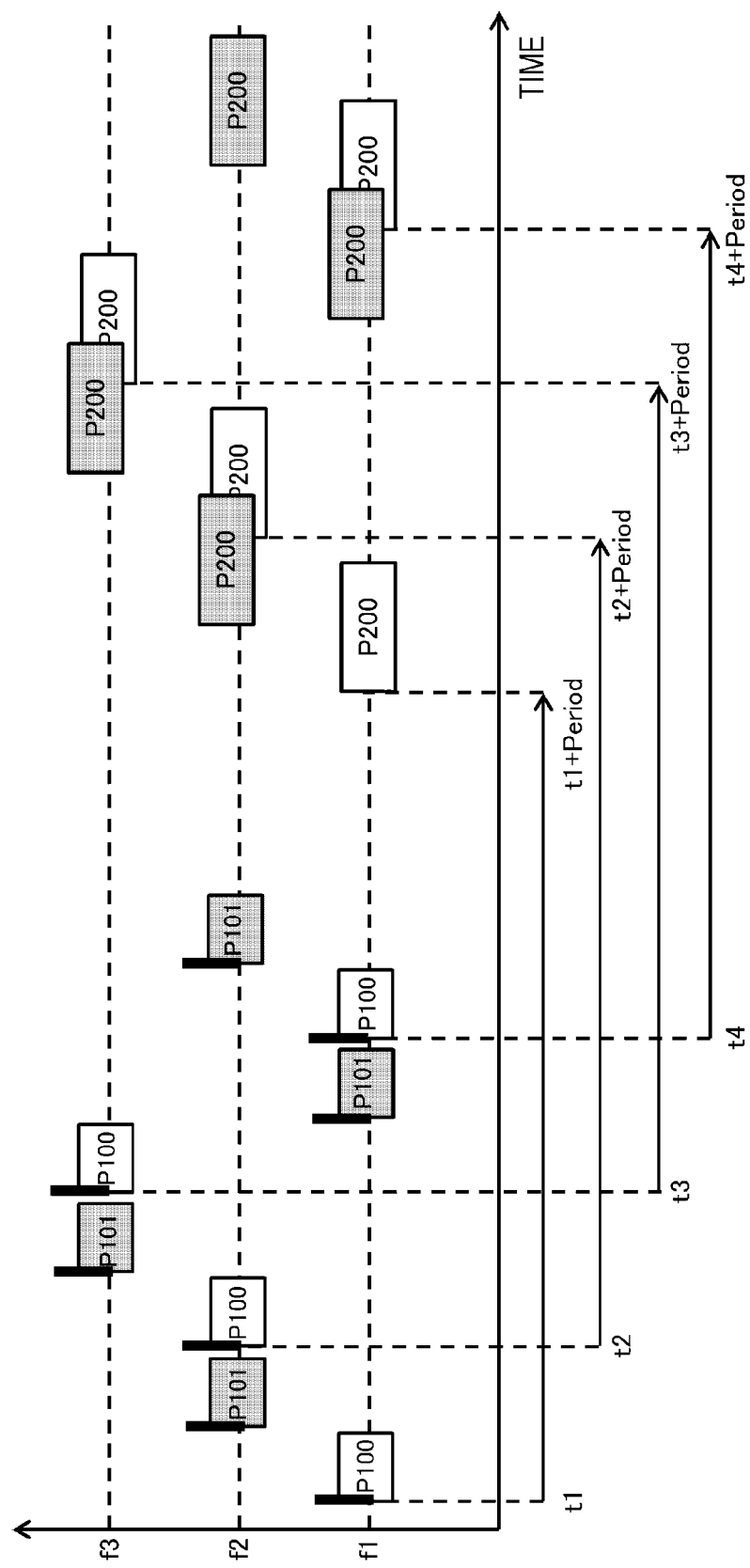
FIG. 12 is a diagram illustrating an operation example in which a base station 200 receives uplink wireless frames from terminals 100 and 101 and transmits downlink wireless frames to the respective terminals 100 and 101.

Furthermore, there is also a problem in a case where the base station receives the uplink wireless frames from a plurality of terminals. FIG. 12 illustrates an operation example in which the base station 200 receives the uplink wireless frames from the terminals 100 and 101 and transmits the downlink wireless frames to the respective terminals 100 and 101. Note that a horizontal axis is a time axis, and a vertical axis is a frequency axis. In the example illustrated in FIG. 12, the terminal 100 selects uplink wireless frame transmission pattern 1 among the plurality of uplink wireless frame transmission patterns illustrated in FIG. 4, and repeatedly transmits the uplink wireless frame P100 by using the frequencies f1, f2, f3, and f1 in order at the transmission timings corresponding to the time points t1, t2, t3, and t4. In addition, the terminal 101 selects uplink wireless frame transmission pattern 2, and repeatedly transmits an uplink wireless frame P101 by using the frequencies f2, f3, f1, and f2 in order at transmission timings different from those of the terminal 100. In FIG. 12, the uplink wireless frame P100 transmitted by the terminal 100 is drawn in a white box, and the uplink wireless frame P101 transmitted by the terminal 101 is drawn in a gray box for distinction.

On the other hand, in a case where the uplink wireless frame P100 from the terminal 100 can be demodulated, the base station 200 transmits the downlink wireless frame P200 to the terminal 100 after a certain period of time Period elapses from each of the uplink frame detection timings t1, t2, t3, and t4 at each of the frequencies f1 to f3. Furthermore, in a case where the uplink wireless frame P101 from the terminal 101 can be demodulated, the base station 200 transmits the downlink wireless frame P200 to the terminal 101 after a certain period of time Period elapses from each of the uplink frame detection timings at each of the frequencies f1 to f3. In FIG. 12, the downlink wireless frame P200 addressed from the base station 200 to the terminal 100 is drawn in a white box, and the downlink wireless frame P200 addressed from the base station 200 to the terminal 101 is drawn in a gray box for distinction.

Here, in order to compensate for a decrease in reception sensitivity due to cost reduction of the terminal, the frame length of the downlink wireless frame P200 from the base station 200 is made longer than those of the uplink wireless frames P100 and P101. Therefore, although the uplink wireless frame P100 from the terminal 100 and the uplink wireless frame P101 from the terminal 101 do not interfere with each other, it is conceivable that the downlink wireless frames P200 addressed from the base station 200 to the terminal 100 and the terminal 101, respectively, after a certain period of time Period elapses from the frame detection timing overlap each other at the same frequency and the same time point. In the example illustrated in FIG. 12, the downlink wireless frames transmitted from the base station 200 to the terminal 100 at the time points t2+Period, t3+Period, and t4+Period overlap the downlink wireless frames transmitted from the base station 200 to the terminal 101 at the same frequencies also on the time axis. In a case where the base station 200 transmits a plurality of frames in an overlapping manner at the same frequency and the same time point, the transmission power is increased.

Since the upper limit of the transmission power of the base station is specified by the laws and regulations of each country, two downlink wireless frames cannot be transmitted at the same frequency and the same time point. Although it is possible to reduce the transmission power for each downlink wireless frame and transmit the downlink wireless frame, in this case, since the transmission power is decreased, a downlink communication distance is shortened. As a result, the same communication distance as that of uplink cannot be realized. That is, long-distance transmission and bidirectional communication between the terminal and the base station cannot be implemented at the same time.

D. Method of Cooperative Transmission Between Base Stations

In this section, a method for solving the problem described in the above-described section C will be described.

FIG. 13 illustrates an operation example in which the base station 200 receives the uplink wireless frames from the terminals 100 and 101 in the wireless system illustrated in FIG. 11. Note that a horizontal axis is a time axis, and a vertical axis is a frequency axis. Furthermore, in FIG. 13, a white box denoted by P100 represents an uplink wireless frame repeatedly transmitted by the terminal 100, and a white box denoted by P101 represents an uplink wireless frame repeatedly transmitted by the terminal 101.

In the example illustrated in FIG. 13, the terminal 100 selects uplink wireless frame transmission pattern 1 among the plurality of uplink wireless frame transmission patterns illustrated in FIG. 4, and repeatedly transmits the uplink wireless frame P100 by using frequencies f1, f2, f3, and f1 in order at transmission timings corresponding to time points t1, t3, t4, and t7. In addition, the terminal 101 selects uplink wireless frame transmission pattern 2, and repeatedly transmits the uplink wireless frame P101 by using the frequencies f2, f3, f1, and f2 in order at transmission timings corresponding to time points t2, t4, t6, and t8. Therefore, the base station 200 and the base station 201 detect the uplink wireless frame P100 from the terminal 100 or the uplink wireless frame P101 from the terminal 101 at any of the frequencies f1 to f3 at each detection timing corresponding to each of the time points t1 to t8. In FIG. 13, it is assumed that thick lines scattered on the horizontal axis for each of the frequencies f1 to f3 represent detection timings at which the frame is detected by the base station.

Since the uplink wireless frames P100 and P101 transmitted by the terminal 100 and the terminal 101 are radiated as electromagnetic waves, they propagate in the air at substantially the speed of light. Therefore, the uplink wireless frame P100 repeatedly transmitted by the terminal 100 using the frequencies f1, f2, f3, and f1 in order at the time points t1, t3, t4, and t7, respectively, and the uplink wireless frame P101 repeatedly transmitted by the terminal 101 using the frequencies f2, f3, f1, and f2 in order at the time points t2, t4, t6, and t8, respectively, arrive at the base station 200 and the base station 201 almost simultaneously, and detection timings of the base station 200 and the base station 201 can be regarded as almost the same time point. Strictly speaking, there is a difference of about several microseconds depending on a propagation distance, but even if the arrival timing is rounded in milliseconds, there is no influence on the cooperative operation, and thus, for the sake of simplicity of description, it is assumed that the detection timings are the same. On the other hand, even in a case of the same downlink wireless frame, reception power (the strength of the correlation value described above) and a reception result are different for each base station.

FIGS. 14 and 15 illustrate reception lists of the base station 200 and the base station 201 in the reception situation illustrated in FIG. 13. The base station 200 and the base station 201 create the reception lists as illustrated in FIGS. 14 and 15, respectively, on the basis of the reception situation thereof. Specifically, each time the base station 200 and the base station 201 detect a frame at any of the frequencies f1 to f3, the base station 200 and the base station 201 index received frame information including a detection timing at that time, reception power of the frame, a detection frequency at which the frame has been detected, and a reception result (OK (demodulation has succeeded) or NG (demodulation has failed)) with an entry number and describes the received frame information in the reception list. Furthermore, in a case where the frame demodulation has succeeded, a transmission source terminal ID stored in the frame is described in the reception result. In a case where the demodulation has failed, the terminal ID need not be described. Note that, in the examples illustrated in FIGS. 14 and 15, only the reception result in a case where the frame demodulation has succeeded is described in the reception list, but it is a matter of course that the reception result in a case where the frame demodulation has failed may be included.

In the present embodiment, a problem of wireless resource occupation due to transmission to a specific terminal in a base station is solved while achieving the long-distance transmission by cooperative transmission in which downlink repetitive transmission is shared by a plurality of base stations. In addition, in the present embodiment, by cooperative transmission, one base station does not transmit a plurality of downlink wireless frames in an overlapping manner at the same frequency and the same time point, such that the transmission power of the base station can comply with a predetermined upper limit. Hereinafter, a case where the base station 200 and the base station 201 perform cooperative transmission by using the server 300 will be described.

The base station 200 and the base station 201 transmit the created reception lists to the server 300. The server 300 creates a combined reception list from the reception lists reported from the base station 200 and the base station 201 on the basis of the detection timing and the detection frequency. FIG. 16 illustrates the combined reception list created from the reception lists illustrated in FIGS. 14 and 15.

The combined reception list is obtained by merging entries of the individual reception lists of the respective base stations on the basis of the frame detection timing and the frame detection frequency. In the reception list of each base station, reception results in which the frame detection timings and the frame detection frequencies are the same can be specified as the same reception results. Therefore, in the combined reception list, the detection timing and the detection frequency are merged into one entry as items common to the base stations, and the reception power and the reception result for each base station are described in each entry.

In addition, a predicted downlink transmission period and a downlink transmission frequency are calculated on the basis of the uplink detection timing and described in each entry of the combined reception list. In the predicted transmission period, a transmission start (START) and a transmission end (END) are calculated by using a fixed delay (Period) until downlink transmission at a detection timing, and a downlink frame length (T_DL). Note that, in order to compensate for the reception sensitivity of the terminal, the downlink frame length (T_DL) is longer than the uplink frame length (described above). In the example illustrated in FIG. 16, the transmission frequency is the same as the frequency at which the uplink is detected. As described above, the transmission frequency may be calculated according to a predetermined rule.

Subsequently, the server 300 specifies a contention group in which downlink transmission of each base station is performed in an overlapping manner at the same frequency and the same time on the basis of the combined reception list. FIG. 17 illustrates an example of specifying the contention group from the combined reception list illustrated in FIG. 16. In FIG. 17, an entry of each specified contention group is surrounded by a thick frame. In the example illustrated in FIG. 17, an entry number No. 1 is grouped into contention group 1, entry numbers No. 2 and No. 3 are grouped into contention group 2, entry numbers No. 4 and No. 5 are grouped into contention group 3, entry numbers No. 6 and No. 7 are grouped into contention group 4, and an entry number No. 8 is grouped into contention group 4.

Then, cooperative transmission is performed for each contention group. Specifically, the server 300 compares the reception power of each base station for each contention group, and determines the base station having the maximum reception power. The determined base station is determined to transmit the downlink wireless frame at the corresponding frequency in the predicted transmission period corresponding to the corresponding terminal. After the determination, the server 300 deletes those whose destination terminal is the same as that of the selected base station from each contention group, performs the same processing again, and sequentially determines the base stations to transmit the downlink wireless frame.

FIG. 18 illustrates a state in which the cooperative processing is performed on contention group 2 among the contention groups illustrated in FIG. 17. First, as illustrated in the upper part of FIG. 18, −67 dBm is selected as the maximum reception power in contention group 2, and it is determined that the base station 201 performs downlink transmission to the terminal 101. Therefore, the base station 201 as a transmission base station and the transmission destination terminal 101 are filled in the rightmost column of the corresponding entry (No. 2) of the contention reception list. Next, as illustrated in the middle part of FIG. 18, since the base station 201 has been selected and the downlink transmission to the terminal 101 has been determined, the base station 201 is deleted from the candidates. Uplink information items of the base station excluded from the candidates are colored in gray. Then, as illustrated in the lower part of FIG. 18, −70 dBm is selected as the maximum reception power among the remaining candidates, and it is determined that the base station 200 performs the downlink transmission to the terminal 100. Therefore, the base station 200 as a transmission base station and the transmission destination terminal 100 are filled in the rightmost column of the corresponding entry (No. 3) of the contention reception list. Similarly, also for contention group 3 and contention group 4, cooperative processing, in which the maximum reception power is first selected in the contention group, the transmission base station of the corresponding entry is determined, and the transmission base stations of the remaining entries are determined among the base stations that are excluded from the candidates, is performed.

FIG. 19 illustrates a result of performing the cooperative processing on all the contention groups (see FIG. 17) extracted from the combined reception list in FIG. 16. The server 300 reports, to the base station 200 and the base station 201, the predicted transmission period of the downlink wireless frame, the transmission frequency, and data to be transmitted in downlink to the destination terminal 100 and the corresponding terminal on the basis of the final cooperative processing result. The base station 200 and the base station 201 transmit the downlink wireless frames designated by the server 300.

FIG. 20 illustrates a state in which the base station 200 and the base station 201 receive the uplink wireless frames from the terminals 100 and 101, respectively, and transmit the downlink wireless frames designated by the server 300. Note that a horizontal axis is a time axis, and a vertical axis is a frequency axis. Here, an example, in which the base station 200 and the base station 201 transmit the downlink wireless frames to the terminals 100 and 101, respectively, according to the cooperative processing result illustrated in FIG. 19, is illustrated.

The upper part of FIG. 20 illustrates a frame transmission/reception operation performed by the base station 200, and the lower part of FIG. 20 illustrates a frame transmission/reception operation performed by the base station 201. In FIG. 20, a white box denoted by "P100" represents an uplink wireless frame repeatedly transmitted by the terminal 100, and a gray box denoted by "P101" represents an uplink wireless frame repeatedly transmitted by the terminal 101. Furthermore, the detection timings at which the base station 200 and the base station 201 have detected the uplink wireless frames are indicated by thick lines. On the other hand, a box denoted by "P200" represents a downlink wireless frame transmitted by the base station 200, and a box denoted by "P201" represents a downlink wireless frame transmitted by the base station 201. Furthermore, among these downlink wireless frames, a white box indicates that the corresponding downlink wireless frame is addressed to the terminal 100, and a gray box indicates that the corresponding downlink wireless frame is addressed to the terminal 101.

In the above-described section C, the problem that the downlink wireless frames from a plurality of base stations interfere with each other in a case where the same terminal performs the uplink transmission with respect to the plurality of base stations has been described with reference to FIG. 12.

On the other hand, it can also be appreciated from FIG. 20 that the base station 200 and the base station 201 perform the cooperative transmission, such that the base station 200 and the base station 201 do not transmit a plurality of downlink wireless frames at the same frequency and the same time point.

In addition, in the above-described section C, it has been mentioned that in a case where the base station receives the uplink wireless frames from a plurality of terminals, the downlink wireless frames addressed to different terminals overlap at the same frequency and the same time point, and long-distance transmission cannot be implemented due to the upper limit of the transmission power, On the other hand, it can also be appreciated from FIG. 20 that as the base station 200 and the base station 201 perform cooperative transmission, the downlink wireless frames addressed to different terminals do not overlap at the same frequency and the same time point in both the base station 200 and the base station 201.

Figure 21:
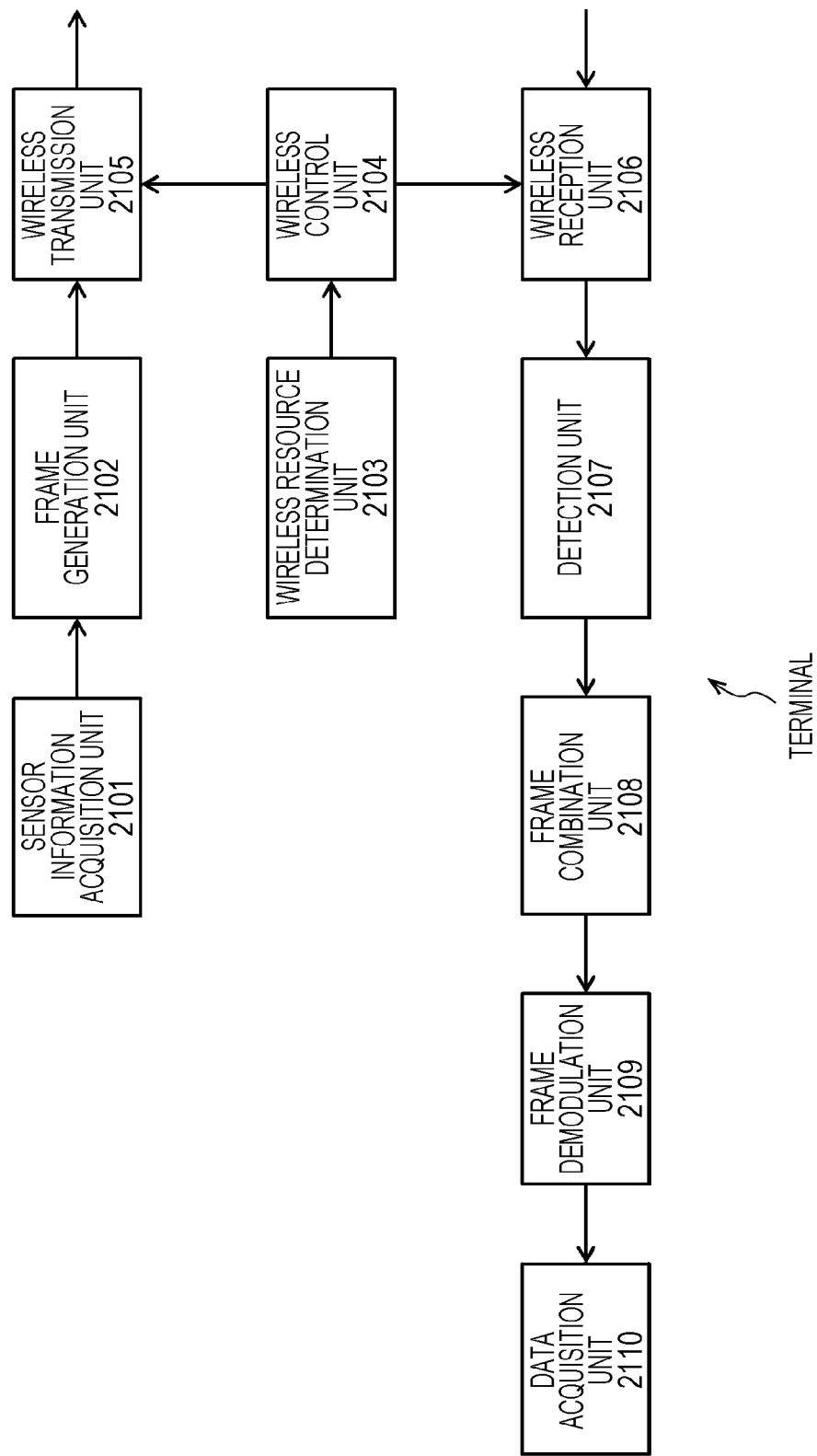
FIG. 21 is a diagram illustrating a configuration example of a communication device that is operated as a terminal.

FIG. 21 illustrates a configuration example of communication devices operated as the terminals 100 and 101 (simply referred to as a "terminal" in the description of FIG. 21) in the wireless system illustrated in FIG. 11. The terminal illustrated in FIG. 21 is a terminal that receives an uplink wireless resource control signal and changes a transmission cycle. The terminal includes a sensor data acquisition unit 2101, a frame generation unit 2102, a wireless resource determination unit 2103, a wireless control unit 2104, a wireless transmission unit 2105, a wireless reception unit 2106, a detection unit 2107, a frame combination unit 2108, a frame demodulation unit 2109, and a data acquisition unit 2110.

The sensor data acquisition unit 2101 selects and acquires sensor data to be transmitted in uplink from a sensor equipped in the terminal 100 (alternatively, a sensor capable of acquiring sensor data from the terminal 100). The sensor data acquisition unit 2101 periodically acquires the sensor data from the sensor, or acquires the sensor data in a case where there is a change in the output of the sensor.

The frame generation unit 2102 generates the uplink wireless frame having the frame configuration illustrated in FIG. 1. Specifically, the frame generation unit 2102 stores the ID of the terminal in the ID, stores the sensor data or the like acquired by the sensor data acquisition unit 2101 in the DATA, and calculates the CRC for the ID and the DATA. Then, the frame generation unit 2102 performs signal processing such as the forward error correction or the interleaving on the ID, the DATA, and the CRC, and adds the preamble pattern unique to the wireless system to the head to generate the uplink wireless frame.

In a case of uplink transmission, the wireless resource determination unit 2103 randomly selects any one of uplink wireless frame repetitive transmission patterns 1 to 3 illustrated in FIG. 4 as a wireless resource for transmission of the uplink wireless frame, and determines a transmission time and a transmission frequency for each number of times the repetitive transmission is performed. In addition, the wireless resource determination unit 2103 determines the downlink reception time and the downlink reception frequency on the basis of the determined uplink wireless frame repetitive transmission pattern. For example, the reception time and the reception frequency are determined as the wireless resources for receiving the downlink wireless frame on the basis of a time point after Period elapses from the uplink transmission time point and the same frequency as that of uplink. Then, the wireless resource determination unit 2103 passes the determined transmission time and transmission frequency, and reception time and reception frequency to the wireless control unit 2104.

The wireless control unit 2104 controls a wireless signal transmission operation performed by the wireless transmission unit 2105 according to the uplink transmission time and the uplink transmission frequency determined by the wireless resource determination unit 2103. In addition, the wireless control unit 2104 controls a wireless signal reception operation performed by the wireless reception unit 2106 according to the downlink reception time and the downlink reception frequency determined by the wireless resource determination unit 2103.

The wireless transmission unit 2105 converts the uplink wireless frame generated by the frame generation unit 2102 into a carrier frequency and transmits the carrier frequency as a wireless signal (electromagnetic waves) at the transmission time point and the transmission frequency controlled by the wireless control unit 2104.

The wireless reception unit 2106 receives the wireless signal (electromagnetic waves) at the reception time point and the reception frequency controlled by the wireless control unit 2104 and converts the received wireless signal into a baseband signal.

The detection unit 2107 detects the wireless frame by calculating the correlation between the unique pattern of the preamble and the received signal. The method for detecting the wireless frame is as described above with reference to FIGS. 2 and 3.

The frame combination unit 2108 combines the repeatedly transmitted wireless frames on the basis of the uplink wireless frame repetitive transmission pattern used at the time of transmission.

The frame demodulation unit 2109 performs signal processing such as the forward error correction or deinterleaving on the received signal after the combination to extract the ID, the DATA, and the CRC. Furthermore, the frame demodulation unit 2109 calculates the CRC for the extracted ID and DATA, and determines that the wireless frame has been successfully received in a case where the calculated CRC matches the CRC extracted from the received signal. In addition, the frame demodulation unit 2109 also determines whether or not the extracted ID matches the terminal ID.

The data acquisition unit 2110 acquires data included in the DATA field in a case where the frame demodulation unit 2109 determines that the downlink wireless frame has been successfully received and determines that the data is data addressed thereto.

The terminal illustrated in FIG. 21 is assumed to be an IoT device, but may include components other than those illustrated in FIG. 21 as necessary.

Figure 22:
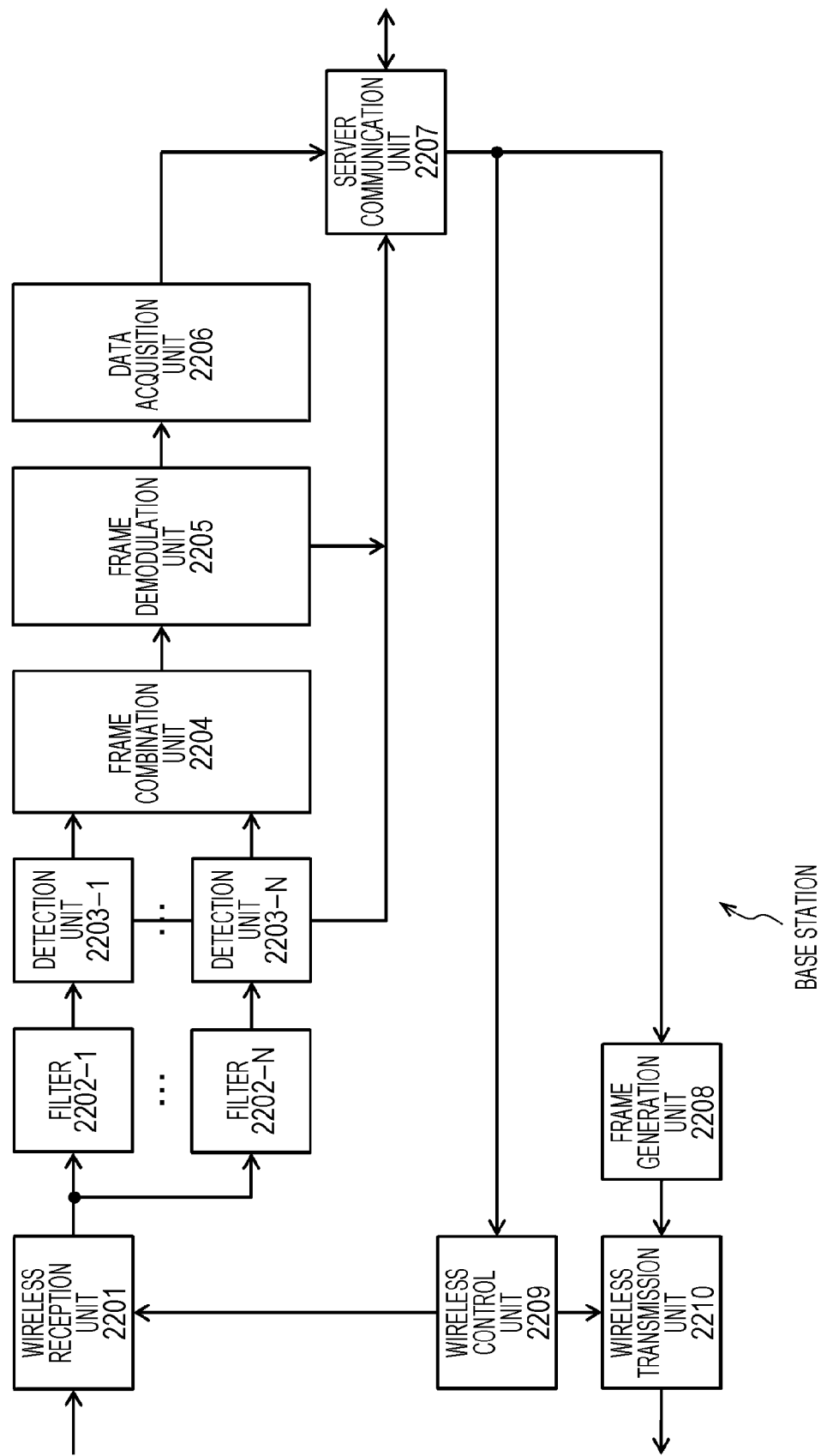
FIG. 22 is a diagram illustrating a configuration example of a communication device that is operated as a base station.

FIG. 22 illustrates a configuration example of communication devices operated as the base stations 200 and 201 (simply referred to as a "base station" in the description of FIG. 22) in the wireless system illustrated in FIG. 11. The base station illustrated in FIG. 22 includes a wireless reception unit 2201, a filter 2202, a detection unit 2203, a frame combination unit 2204, a frame demodulation unit 2205, a data acquisition unit 2206, a server communication unit 2207, a frame generation unit 2208, a wireless control unit 2209, and a wireless transmission unit 2210.

The wireless reception unit 2201 is operated to receive all frequencies used in the wireless system, and converts the received wireless signal (electromagnetic waves) into a baseband signal.

The filter 2202 extracts information for each frequency channel from data including each frequency acquired by the wireless reception unit 2201. In the example illustrated in FIG. 22, the filter 2202 includes a plurality of (N) filters (BPF) 2202-1, . . . , and 2202-N provided for each frequency. However, N is a frequency available in the wireless system, and N=3 in a case where three frequency channels f1 to f3 described above are used.

The detection unit 2203 detects the wireless frame by calculating the correlation between the unique pattern of the uplink preamble and the received signal. In the example illustrated in FIG. 22, N detection units 2203-1, ..., and 2202-N are arranged corresponding to the N filters 2202-1, ..., and 2203-N for each frequency, respectively, and perform wireless frame detection processing on the received signals for each frequency channel output from the plurality of (N) filters (BPF) 2202-1, 2202-2, ..., and 2202-N.

The frame combination unit 2204 compares the detection results of the detection units 2203-1, ..., and 2203-N with uplink wireless frame repetitive transmission patterns 1 to 3 illustrated in FIG. 4, selects a detection result matching any one of the patterns, and performs the frame combination.

The frame demodulation unit 2205 performs signal processing such as the forward error correction or the deinterleaving on the received signal after the combination to extract the ID, the DATA, and the CRC. Furthermore, the frame demodulation unit 2205 calculates the CRC for the extracted ID and DATA, and determines that the wireless frame has been successfully received in a case where the calculated CRC matches the CRC extracted from the received signal. In addition, the frame demodulation unit 2205 also determines whether or not the extracted ID matches the terminal ID.

The data acquisition unit 2206 acquires data included in the DATA field in a case where the frame demodulation unit 2205 determines that the downlink wireless frame has been successfully received and determines that the data is data addressed thereto.

The server communication unit 2207 performs communication with the server 300 via a general wide area line such as the Internet. In the present embodiment, the server communication unit 2207 reports, to the server 300, the detection results (detection timings and reception power) of the detection units 2203-1, ..., and 2203-N, the reception list (see FIGS. 14 and 15) generated on the basis of the determination result of the frame demodulation unit 2205 that indicates whether or not the frame reception has succeeded, and the data (sensor data) acquired by the data acquisition unit 2206. In addition, the server communication unit 2205 acquires, from the server 300, the downlink transmission time point and the downlink transmission frequency for each terminal, the destination, and the data to be transmitted, and provides them to the wireless control unit 2209 and the frame generation unit 2208.

The frame generation unit 2208 generates the downlink wireless frame. The downlink wireless frame has the same frame configuration as the uplink wireless frame illustrated in FIG. 1. Specifically, the frame generation unit 2208 calculates the CRC for the destination terminal ID and DATA provided from the server 300, performs signal processing such as the forward error correction or the interleaving on the ID, the DATA, and the CRC, and adds the preamble pattern unique to the wireless system to the head to generate the wireless frame. However, in order to obtain the reception sensitivity equivalent to that of the base station in the terminal manufactured at a low cost, a length of redundant bits for the forward error correction becomes longer, such that the frame length becomes longer than that of the uplink wireless frame.

The wireless control unit 2209 controls the wireless reception unit 2201 to receive the wireless signal at all frequencies used in the wireless system. In addition, the wireless control unit 2209 controls the wireless transmission unit 2210 to transmit the downlink wireless frame to each terminal at the downlink transmission time point and the downlink transmission frequency provided from the server 300.

The wireless transmission unit 2210 converts the wireless frame generated by the frame generation unit 2208 into a carrier frequency and transmits the carrier frequency as a wireless signal (electromagnetic waves) at the transmission time point and the transmission frequency controlled by the wireless control unit 2209.

Figure 23:
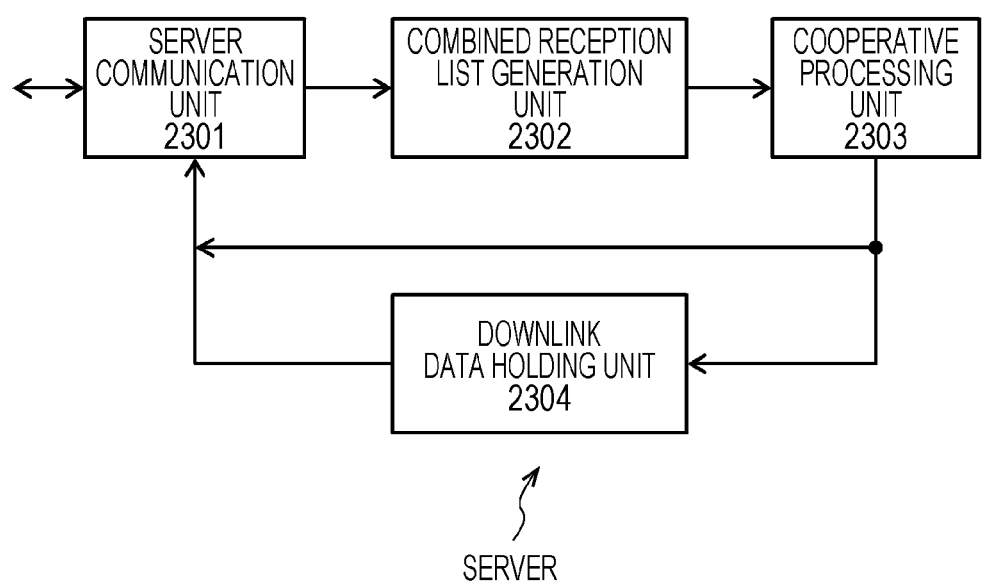
FIG. 23 is a diagram illustrating a configuration example of a communication device that is operated as a server.

FIG. 23 illustrates a configuration example of a communication device operated as the server 300 in the wireless system illustrated in FIG. 11. The server illustrated in FIG. 23 includes a server communication unit 2301, a combined reception list generation unit 2302, a cooperative processing unit 2303, and a downlink data holding unit 2304.

The server communication unit 2301 performs communication with the base stations 200 and 201 via a general wide area line such as the Internet. In the present embodiment, the server communication unit 2301 receives the reception list in addition to the data (sensor data) acquired by the terminals 100 and 101 from the base stations 200 and 201.

The combined reception list generation unit 2302 generates the combined reception list (see FIG. 16) by merging the respective reception lists reported from the base stations 200 and 201 on the basis of the frame detection timing and the frame detection frequency. The combined reception list generation unit 2302 merges the reception power and the reception result for each base station into one entry, further calculates the predicted downlink transmission period and the downlink transmission frequency from the detection timing, and describes them in each entry of the combined reception list.

The cooperative processing unit 2303 specifies a contention group in which downlink transmission of each base station is performed in an overlapping manner at the same frequency and the same time on the basis of the combined reception list generated by the combined reception list generation unit 2302, and performs cooperative processing for each contention group. Specifically, the cooperative processing unit 2303 compares the reception power of each base station for each contention group and determines that the base station having the maximum reception power transmits the downlink wireless frame at the corresponding frequency in the predicted transmission period corresponding to the corresponding terminal. In addition, after the determination, those whose destination terminal is the same as that of the selected base station are deleted from each contention group, and the same processing is performed again (see FIG. 19).

The downlink data holding unit 2304 holds data to be transmitted to the terminals 100 and 101 (alternatively, downlink data transmitted from the base stations 200 and 201).

Then, the predicted transmission period of the downlink wireless frame, the transmission frequency, the destination terminal, and the data to be transmitted in downlink to the corresponding terminal held by the downlink data holding unit 2304 are provided to the base station 200 and the base station 201 via the server communication unit 2301 on the basis of the final cooperative processing result of the cooperative processing unit 2303.

Figure 24:
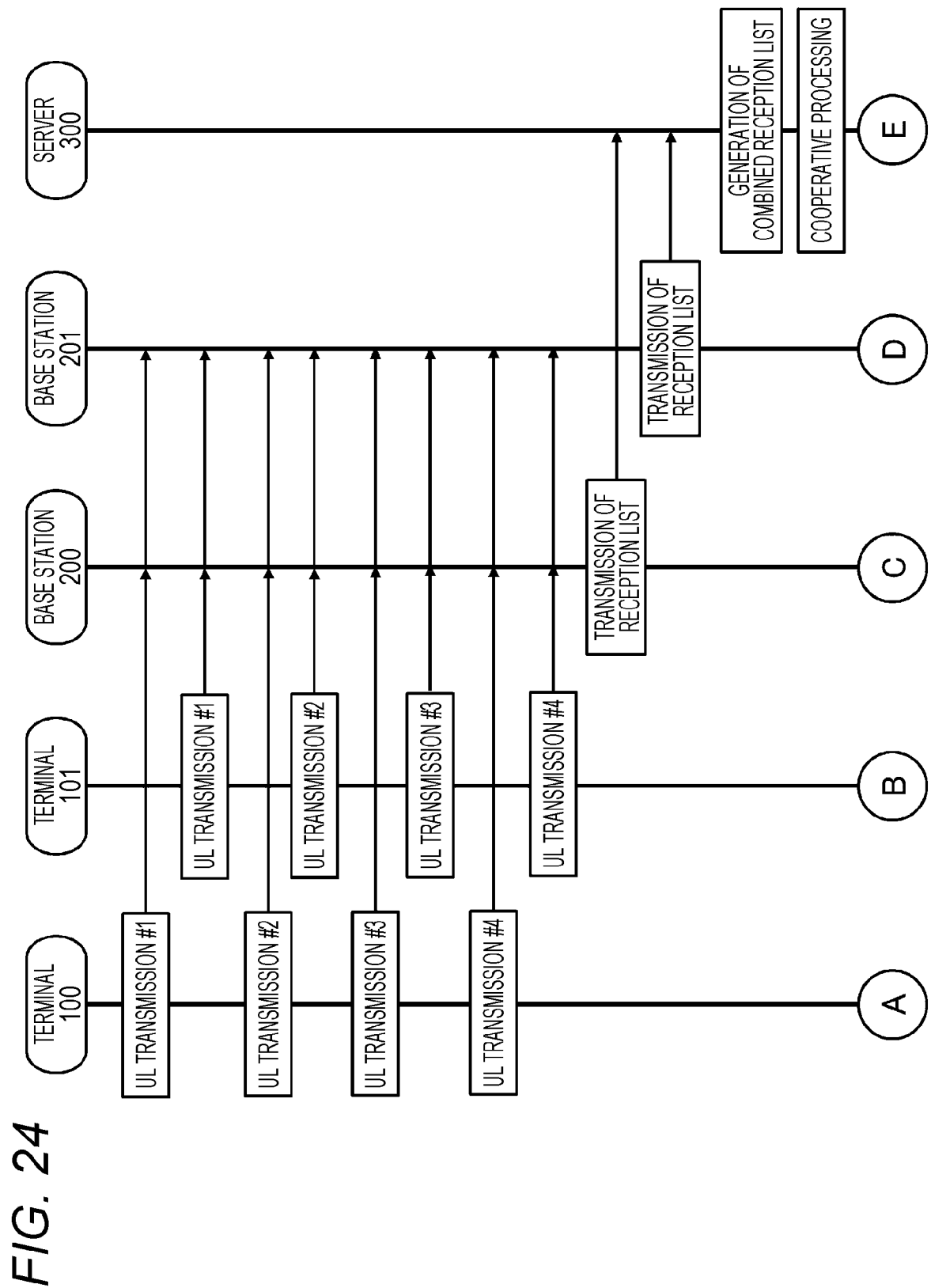
FIG. 24 is a diagram illustrating an example of a communication sequence (the first half) of the entire wireless system.
Figure 25:
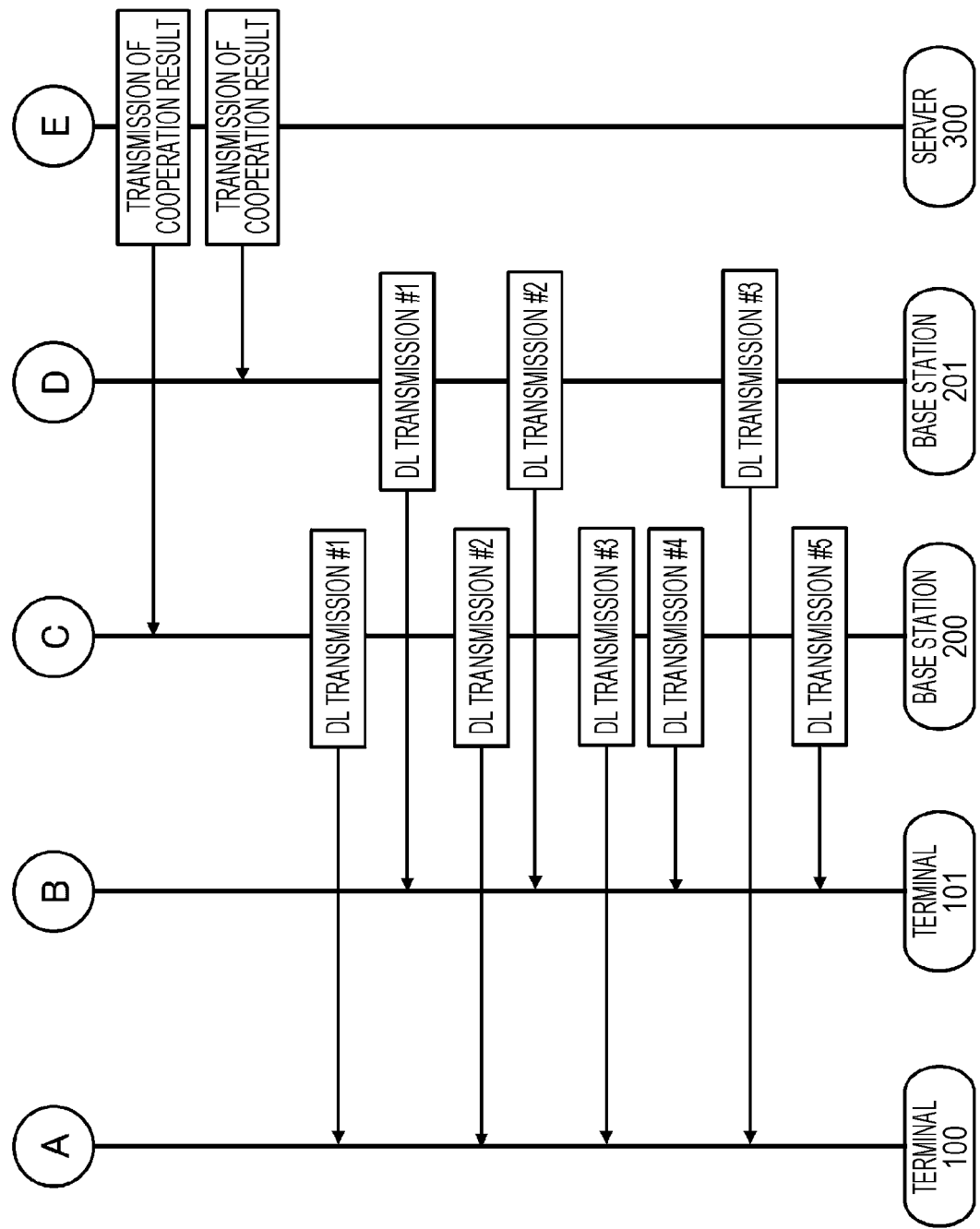
FIG. 25 is a diagram illustrating the example of the communication sequence (the second half) of the entire wireless system.

FIGS. 24 and 25 illustrate an example of a communication sequence of the entire wireless system illustrated in FIG. 11.

The terminal 100 selects any one of uplink wireless frame transmission patterns 1 to 3 illustrated in FIG. 4 to perform the repetitive transmission (UL transmissions #1 to #4) of the uplink wireless frame for four times from an arbitrary time point at which a transmission right is acquired. In addition, the terminal 101 also selects any one of the uplink wireless frame transmission patterns and performs the repetitive transmission of the uplink wireless frame (UL transmissions #1 to #4) for four times from an arbitrary time point.

The base station 200 generates the reception list (see FIG. 14) on the basis of the detection result and the determination result and the success/failure determination result of the frame reception as uplink wireless frame reception information from the terminal 100 and the terminal 101, and reports the reception list to the server 300. Furthermore, the base station 201 also generates the reception list (see FIG. 15) on the basis of the detection result and the success/failure determination result of the frame reception as uplink wireless frame reception information from the terminal 100 and the terminal 101, and reports the reception list to the server 300.

The server 300 generates the combined reception list by merging the respective reception lists reported from the base stations 200 and 201 on the basis of the frame detection timing and the frame detection frequency. At this time, the reception power and the reception result for each base station are merged into one entry, the predicted downlink transmission period and the downlink transmission frequency are further calculated from the detection timing and described in each entry of the combined reception list (see FIG. 16).

Next, the server 300 specifies a contention group in which downlink transmission of each base station is performed in an overlapping manner at the same frequency and the same time on the basis of the combined reception list, and performs cooperative processing for each contention group (see FIGS. 17 to 19). Specifically, the reception power of each base station is compared for each contention group and it is determined that the base station having the maximum reception power transmits the downlink wireless frame at the corresponding frequency in the predicted transmission period corresponding to the corresponding terminal. In addition, after the determination, those whose destination terminal is the same as that of the selected base station are deleted from each contention group, and the same processing is performed again.

Then, the server 300 provides the final contention processing result to the base station 200 and the base station 201. The final cooperative processing result includes the predicted transmission period of the downlink wireless frame, the transmission frequency, and information regarding the destination terminal (see FIG. 19). In addition, at that time, in a case where the server 300 holds data to be transmitted in downlink to the terminal 100 and the terminal 101, the data to be transmitted in downlink is provided to the base station 200 and the base station 201.

The base station 200 performs the repetitive transmission (DL transmissions #1 to #3) of the downlink wireless frame to each terminal for four times at the downlink transmission time point and the downlink transmission frequency provided from the server 300. Furthermore, the base station 201 also performs the repetitive transmission (DL transmissions #1 to #3) of the downlink wireless frame to each terminal for four times at the downlink transmission time point and the downlink transmission frequency provided from the server 300. FIG. 25 illustrates an example in which both the base station 200 and the base station 201 perform downlink transmission on the basis of the cooperative processing result illustrated in FIG. 19.

Figure 26:
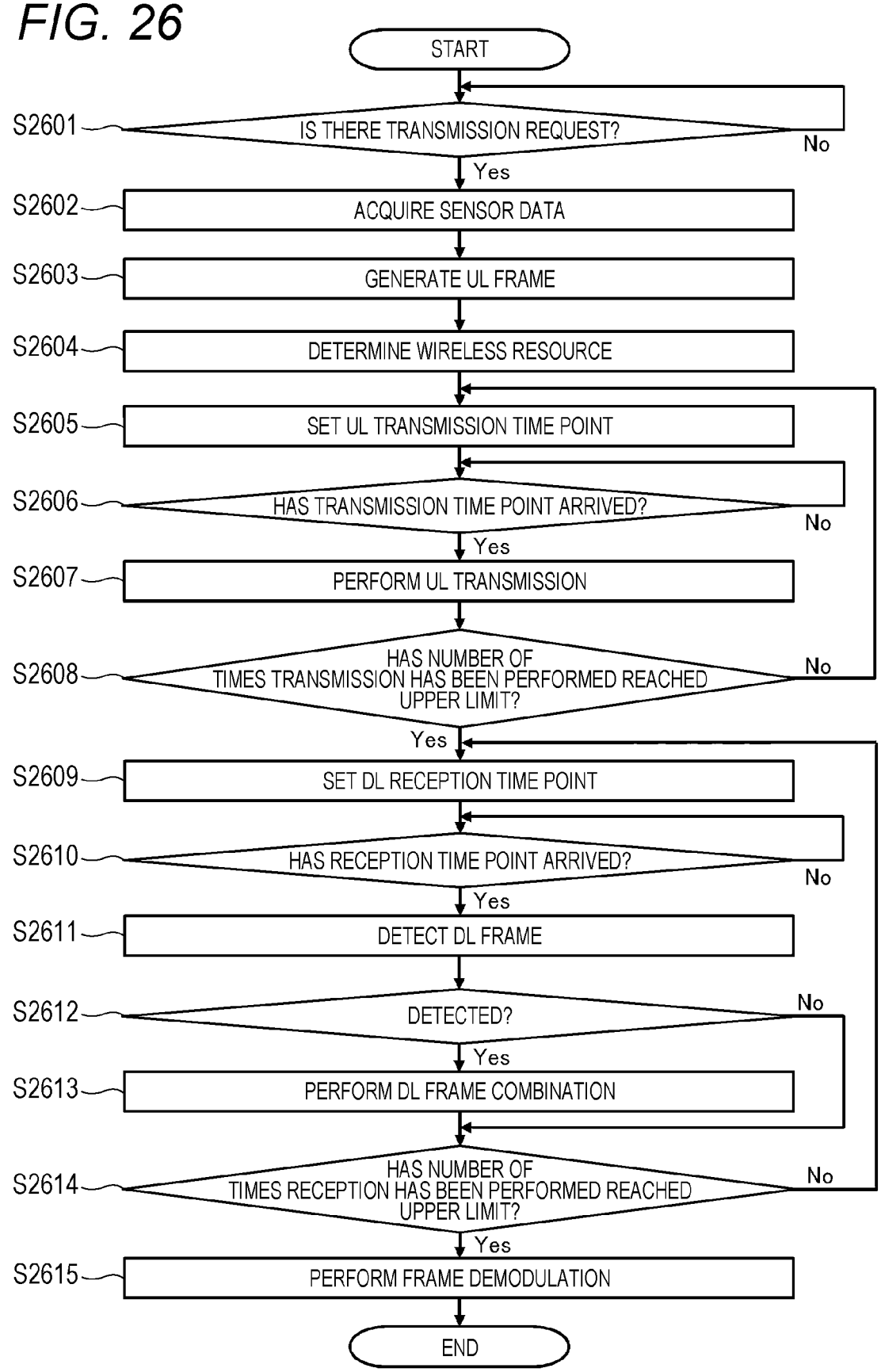
FIG. 26 is a flowchart illustrating a communication operation performed by the terminal.

FIG. 26 illustrates a flowchart of a communication operation performed by the communication devices operated as the terminal 100 and the terminal 101 in the wireless communication system. The communication device operated as the terminal is assumed to have the device configuration illustrated in FIG. 21.

In the terminal, in a case where an uplink transmission request is generated (Yes in Step S2601), the sensor data acquisition unit 2101 selects and acquires sensor data to be transmitted in uplink from a sensor equipped in the terminal (alternatively, a sensor capable of acquiring sensor data from the terminal 100) (Step S2602). For example, a transmission request is generated periodically or in a case where there is a change in the output of the sensor, and the sensor data acquisition unit 2101 acquires the sensor data.

Next, the frame generation unit 2102 generates an uplink wireless frame that stores the sensor data acquired in Step S2602 (Step S2603).

Further, the wireless resource determination unit 2103 determines a wireless resource for transmitting the uplink wireless frame (Step S2604). Specifically, the wireless resource determination unit 2103 randomly selects any one of uplink wireless frame repetitive transmission patterns 1 to 3 illustrated in FIG. 4, and determines a transmission time and a transmission frequency for each number of times the repetitive transmission is performed.

The wireless control unit 2104 sets a transmission time point at which a wireless frame is to be transmitted by the wireless transmission unit 2105 according to the uplink transmission time and the uplink transmission frequency determined by the wireless resource determination unit 2103 (Step S2605). Then, once the transmission time point arrives (Yes in Step S2606), the wireless transmission unit 2105 performs uplink transmission of the wireless frame generated in Step S2603 (Step S2607).

Thereafter, the uplink wireless frame transmission in Steps S2605 to S2607 described above is repeatedly performed until the number of times the repetitive transmission has been performed reaches the upper limit (four times in the example illustrated in FIG. 4) (No in Step S2608).

Then, once the repetitive transmission of the uplink wireless frame ends (Yes in Step S2608), the terminal subsequently starts an operation of receiving a downlink wireless frame.

The wireless resource determination unit 2103 determines a downlink reception time and a downlink reception frequency on the basis of the uplink wireless frame repetitive transmission pattern determined in Step S2604 (Step S2609). For example, a time point after a certain period of time (Period) elapses after the uplink wireless frame is transmitted at each frequency is set as a reception time point at the same frequency.

Then, once the reception time point arrives (Yes in Step S2610), the wireless reception unit 2106 performs wireless signal reception processing at the corresponding reception frequency, and subsequently, the detection unit 2107 detects the downlink wireless frame by calculating the correlation between the unique pattern of the preamble and the received signal (Step S2611). Then, in a case where the downlink wireless frame can be detected (Yes in Step S2612), the frame combination unit 2108 combines the detected downlink wireless frames on the basis of the uplink wireless frame repetitive transmission pattern used at the time of the transmission (Step S2613).

Thereafter, the downlink wireless frame reception in Steps S2609 to S2611 described above is repeatedly performed until the number of times the repetitive reception has been performed reaches the upper limit (four times in the example illustrated in FIG. 4) (No in Step S2614).

The frame demodulation unit 2109 performs signal processing such as the forward error correction or the deinterleaving on the received signal after the combination to reproduce the original transmitted data (Step S2615). At that time, whether or not the reception of the downlink wireless frame has succeeded is determined and whether or not the wireless frame is addressed thereto is checked through CRC checking.

Figure 27:
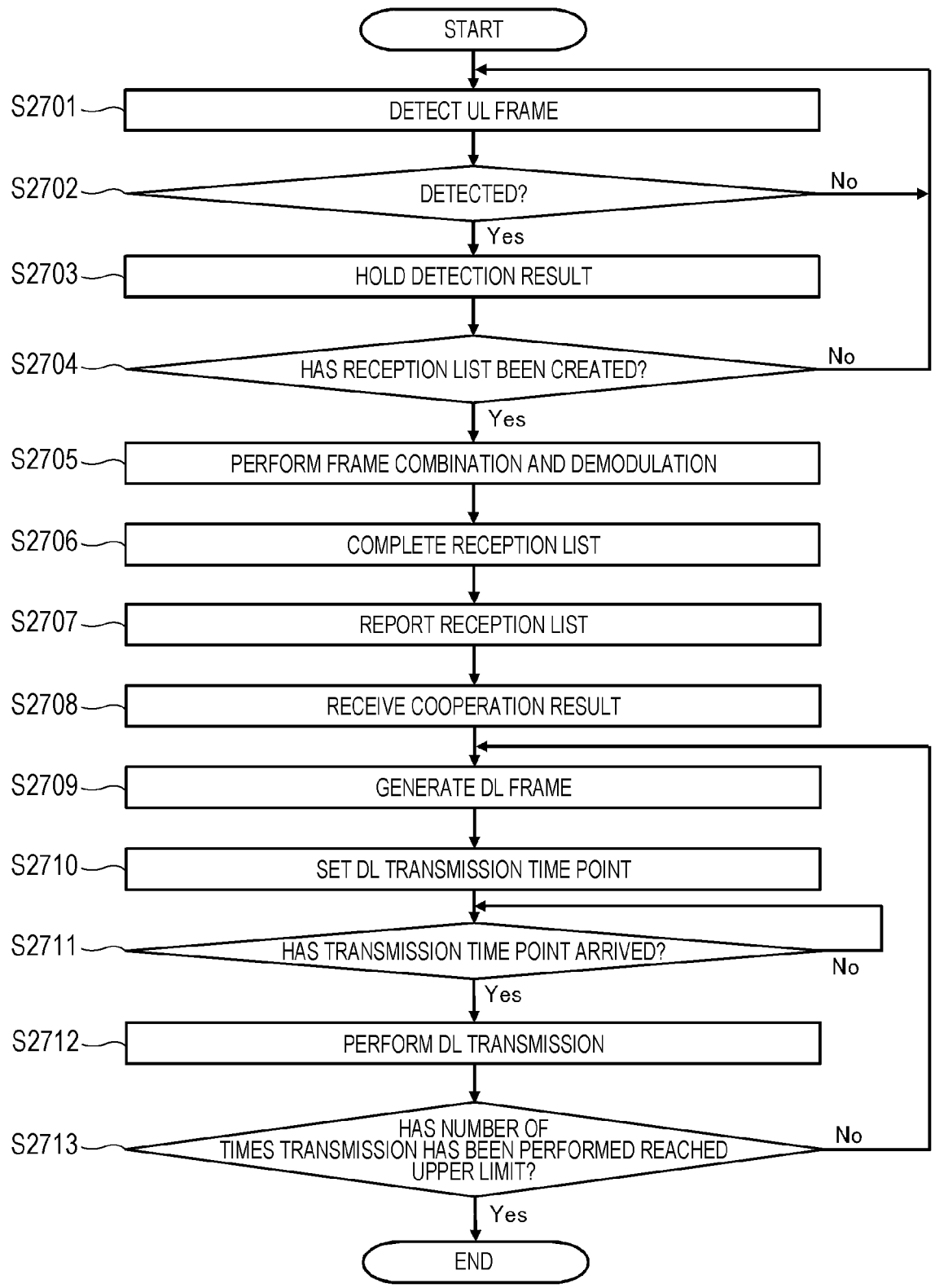
FIG. 27 is a flowchart illustrating a communication operation performed by the base station.

FIG. 27 illustrates a flowchart of a communication operation performed by the communication devices operated as the base station 200 and the base station 201 in the wireless communication system. The communication device operated as the base station is assumed to have the device configuration illustrated in FIG. 22.

The wireless reception unit 2201 is operated to receive all frequencies used in the wireless system, and converts the received wireless signal (electromagnetic waves) into a baseband signal. Then, the detection unit 2203 attempts to detect the wireless frame by calculating the correlation between the unique pattern of the uplink preamble and the received signal (Step S2701).

In a case where the wireless frame can be detected (Yes in Step S2702), the detection result of the detection unit 203 is held (Step S2703). Specifically, every time the frame is detected, the detection timing at that time, the frame reception power, and the detection frequency at which the frame is detected are described in the entry of the reception list.

The frame is detected for a predetermined number of times the reception has been performed (for example, four times), and the processing returns to Step S2701 and the frame detection is repeatedly performed until all the entries of the reception list can be created (No in Step S2704).

Once the reception list is created (Yes in Step S2704), the frame combination unit 2204 then performs pattern matching between the wireless frame detection result and each uplink wireless frame transmission pattern that may be used by the terminal, selects a detection result matching any pattern, and performs the frame combination (Step S2705). Then, the frame demodulation unit 2205 performs signal processing such as the forward error correction or the deinterleaving on the received signal after the combination to reproduce the original transmitted data. At that time, whether or not the reception of the downlink wireless frame has succeeded is determined and whether or not the wireless frame is addressed thereto is checked through CRC checking. Furthermore, the data acquisition unit 2206 acquires data included in the DATA field in a case where the frame demodulation unit 2205 determines that the downlink wireless frame has been successfully received and determines that the data is data addressed thereto.

Next, once the reception result (OK (demodulation has succeeded) or NG (demodulation has failed)) is described in the reception list and the reception list is completed (Step S2706), the server communication unit 2207 reports the generated reception list and the data (sensor data) acquired by the data acquisition unit 2206 to the server 300 (Step S2707).

Thereafter, the server communication unit 2207 acquires, from the server 300, the downlink transmission time point and the downlink transmission frequency for each terminal, the cooperation result including information regarding the destination, and the data to be transmitted, and provides them to the wireless control unit 2209 and the frame generation unit 2208 (Step S2708).

The frame generation unit 2208 generates a downlink wireless frame for transmitting the data provided from the server 300 to the destination terminal ID provided from the server 300 (Step S2709).

In addition, the wireless control unit 2209 sets, for the wireless transmission unit 2210, the downlink transmission time point and the downlink transmission frequency provided from the server 300 (Step S2710).

Then, once the downlink transmission time point arrives (Yes in Step S2711), the wireless frame generated by the frame generation unit 2208 is converted into a carrier frequency, and transmits the carrier frequency a wireless signal (electromagnetic waves) at the transmission frequency provided from the server 300 (Step S2712).

Thereafter, the downlink wireless frame transmission in Steps S2710 to S2712 is repeatedly performed until the number of times the repetitive transmission has been performed based on the cooperation result acquired from the server 300 reaches the upper limit (No in Step S2713).

Then, once the repetitive transmission of the downlink wireless frame ends (Yes in Step S2713), the base station ends this processing.

Figure 28:
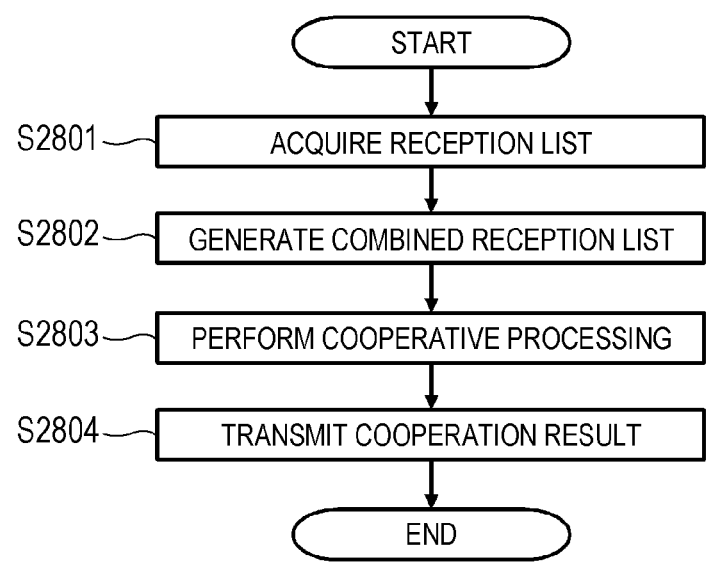
FIG. 28 is a flowchart illustrating a processing procedure performed by the server.

FIG. 28 illustrates a flowchart of an operation performed by the communication device operated as the server 300. The communication device operated as the server is assumed to have the device configuration illustrated in FIG. 23.

The server communication unit 2301 receives the data (sensor data) acquired by the terminals 100 and 101 and the reception lists (see FIGS. 14 and 15) from the base stations 200 and 201 (Step S2801).

The combined reception list generation unit 2302 generates the combined reception list (see FIG. 16) by merging the respective reception lists reported from the base stations 200 and 201 on the basis of the frame detection timing and the frame detection frequency (Step S2802).

Next, the cooperative processing unit 2303 specifies a contention group in which downlink transmission of each base station is performed in an overlapping manner at the same frequency and the same time on the basis of the combined reception list (see FIG. 16), and performs cooperative processing for each contention group (Step S2803). Specifically, the cooperative processing unit 2303 compares the reception power of each base station for each contention group and determines that the base station having the maximum reception power transmits the downlink wireless frame at the corresponding frequency in the predicted transmission period corresponding to the corresponding terminal. In addition, after the determination, those whose destination terminal is the same as that of the selected base station are deleted from each contention group, and the same processing is performed again (see FIGS. 17 to 19).

Then, the server communication unit 2301 transmits, to the base station 200 and the base station 201, the predicted transmission period of the downlink wireless frame, the transmission frequency, the destination terminal, and the data to be transmitted in downlink to the corresponding terminal held by the downlink data holding unit 2304 on the basis of the final cooperative processing result of the cooperative processing unit 2303 (Step S2804), and ends this processing.

Note that although the server 300 independent of the base station 200 and the base station 201 performs the cooperative processing in the above description, a configuration in which any one of the base station 200 and the base station 201 has the function of the server to perform the cooperative processing is also possible.

In addition, although the embodiment in which the wireless system includes two base stations and two terminals has been described above, it is possible to simultaneously implement long-distance transmission and bidirectional communication between a terminal and a base station also in a wireless system including three or more base stations and three or more terminals by avoiding mutual interference of downlink wireless frames from a plurality of base stations and overlapping between wireless resources of downlink wireless frames addressed to a plurality of terminals by performing similar cooperative processing.

Second Embodiment

FIG. 29 illustrates another configuration example of the combined reception list generated in the server 300. A difference from the combined reception list illustrated in FIG. 16 is that the combined reception list illustrated in FIG. 29 also includes reception information indicating that the base station 201 was able to detect the frame, but failed in frame modulation. FIG. 30 illustrates a result of performing cooperative processing on the basis of the combined reception list illustrated in FIG. 29. In order to perform the cooperative processing on the basis of the correlation value (reception power) of the preamble, the cooperative processing is performed such that the base station 201 that has failed in frame demodulation also performs downlink transmission.

For example, in a case where a target terminal is present at an intermediate point between the base station 200 and the base station 201, a cooperative processing result in which a download wireless frame is transmitted from the base station 201 that has failed in frame demodulation can be obtained. In a case where there is a moving obstacle around the terminal, combination reception may fail due to an influence of the moving obstacle. However, since the moving obstacle does not present at the time of downlink transmission, a site diversity effect can be expected by performing transmission from a plurality of base stations.

The base station having the maximum reception power has been selected by adjusting the contention group, but the base station has failed in reception, and thus the destination terminal may be unknown. Even in such a case, it is possible to specify the destination terminal on the basis of the reception result of another base station by using the combined reception list. As a result, the base station that has failed in reception can also perform downlink transmission.

FIG. 31 illustrates a state in which the cooperative processing is performed on the contention group 2 including the entry numbers No. 2 and No. 3 in the combined reception list illustrated in FIG. 29. The maximum reception power is −100 dBm for the base station 200 and is −67 dBm for the base station 201, and the base station 201 is selected. In this case, in the reception result of the base station 201, frame demodulation has failed, and the destination terminal is unknown. Therefore, it is possible to specify that the destination terminal is the terminal 101 by referring to the entry of the base station 200 having the same number (No. 2) and the reception result indicating OK (reception has succeeded) in the combined reception list. As a result, downlink transmission from the base station 201 to the terminal 101 can be performed.

Third Embodiment

Next, still another embodiment related to the cooperative processing of the base station will be described. In the present embodiment, each terminal transmits accompanying information to a base station together with sensor data during uplink transmission, and each base station reports the accompanying information of the terminal to a server together with a reception list. Then, the server creates a combined reception list from the reception list of each base station, further corrects the combined reception list on the basis of the accompanying information of each terminal, and then performs contention processing.

In a case of performing uplink transmission, the terminal 100 and the terminal 101 transmit accompanying information that can be used to predict movement of the terminal, such as a current reception position, a future moving direction and moving speed, to the base station together with the sensor data. The base station 200 and the base station 201 acquire, by the data acquisition unit 2206, information regarding the current reception positions of the terminal 100 and the terminal 101 and the future moving direction and moving speed together with the sensor data, and report the information to the server 300. Then, the server 300 combines reception lists reported from the base station 200 and the base station 201, the current reception positions of the terminal 100 and the terminal 101, and the information regarding the future moving direction and moving speed, and performs the cooperative processing.

Specific cooperative processing will be described. Note that reception lists reported from the base station 200 and the base station 201 are the same as those in FIGS. 14 and 15. The cooperative processing unit 2303 in the server 300 can calculate which one of the base station 200 and the base station 201 the terminal 100 approaches at a scheduled time for performing downlink transmission on the basis of, for example, the current position, the moving direction, and the moving speed reported by the terminal 100 and position information of the base station 200 and the base station 201. In addition, an interval (Period) from an uplink reception time point to a downlink transmission is known in the wireless system. In addition, a moving distance can be calculated from the moving speed of the terminal 100, and it is possible to know which base station the terminal 100 approaches from the current position and the moving direction.

Figure 32:
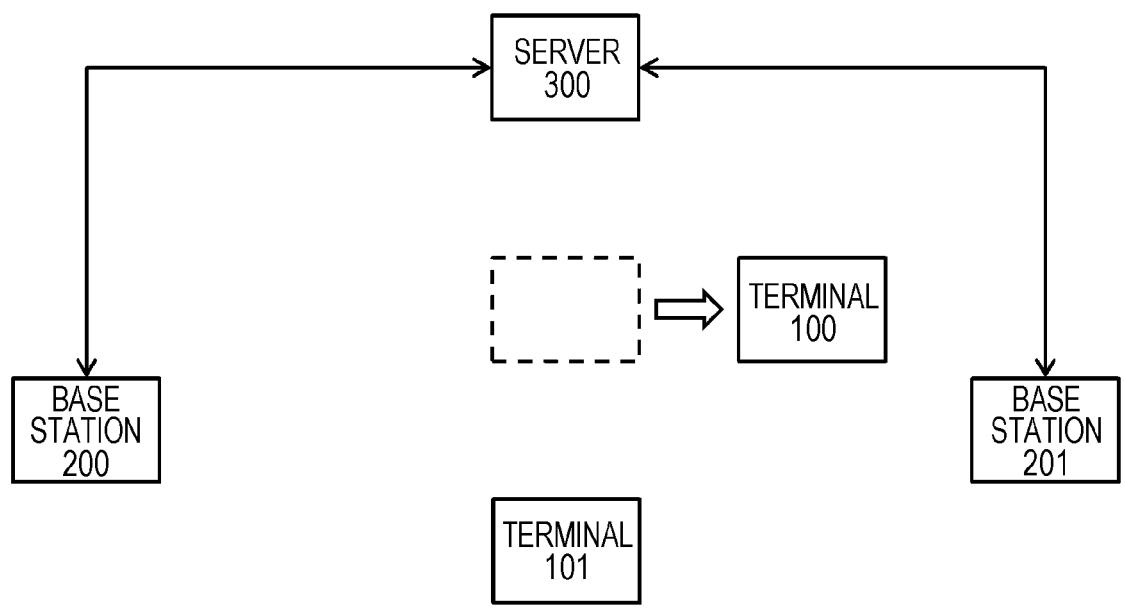
FIG. 32 is a diagram illustrating a state in which a terminal 100 moves in the wireless system illustrated in FIG. 11.

FIG. 32 illustrates a state in which the terminal 100 moves in the wireless system illustrated in FIG. 11. In the illustrated example, it is expected that the terminal 100 approaches the base station 201 at the time of downlink transmission.

In a case where the combined reception list is created from the reception lists illustrated in FIGS. 14 and 15, the reception power of the base station 201 is added according to a distance by which the terminal 100 is expected to approach, and then the combined reception list is created. For example, in a case where the terminal 100 is expected to approach the base station 201 by 1 km, processing of adding +10 dBm is performed. Alternatively, assuming that the terminal 100 is away from the base station 200 by 1 km or, conversely, moves away from the base station 200, processing of adding the reception power of the base station 200 by −10 dBm may be performed.

It is expected that more efficient downlink transmission can be performed by performing the cooperative processing after the reception power of the base station 200 or the base station 201 is converted in this manner. In the example illustrated in FIG. 32, since the terminal 100 moves away from the base station 200, it is not efficient to perform downlink transmission from the base station 200, and the reception probability is increased in a case where downlink transmission from the base station 201 is performed. Therefore, the server 300 determines to perform downlink transmission from the base station 201 to the terminal 100 on the basis of the cooperative processing result.

In a case where the combined reception list is created from the reception lists as described above, a more efficient cooperative control can be performed by reflecting accompanying information such as the position information, the moving direction, and the moving speed reported from the terminal.

Three embodiments of the technology disclosed in the present specification have been described so far. Finally, effects brought by the technology disclosed in the present specification will be summarized.

(1) As a plurality of base stations performs transmission with respect to the same terminal, interference in terminal reception does not occur, and a reception success rate of the terminal is improved.

(2) In a case of downlink transmission to a plurality of terminals, it is possible to prevent transmission from being disabled due to a shortage of wireless resources in the base station, and to implement long-distance communication by repetitive downlink transmission.

(3) By determining base stations to perform downlink transmission in a cooperative manner by using reception results of a plurality of base stations, it is possible to obtain a site diversity effect by taking a part of repetitive transmission even in a case where reception cannot be performed by a single base station.

(4) By acquiring information regarding a phase from the terminal, the base station that performs downlink transmission is emphasized and efficiently determined, such that a downlink communication success rate is increased.

INDUSTRIAL APPLICABILITY

Hereinabove, the technology disclosed in the present specification has been described in detail with reference to specific embodiments. However, it is obvious that those skilled in the art can make modifications and substitutions of the embodiments without departing from the gist of the technology disclosed in the present specification.

The technology disclosed in the present specification can be applied to, for example, the IoT field to simultaneously implement long-distance transmission and bidirectional communication between a terminal and a base station, and it is a matter of course that technology disclosed in the present specification can be similarly applied to various types of wireless systems including a terminal and a base station.

In short, the technology disclosed in the present specification has been described in the form of exemplification, and the contents described in the present specification should not be restrictively interpreted. In order to determine the gist of the technology disclosed in the present specification, the claims should be taken into consideration.

Note that the technology disclosed in the present specification can have the following configuration.

(1) An information processing device including:
a collection unit that collects each piece of reception information of a plurality of base stations that receives an uplink frame from a terminal; and
a processing unit that processes cooperative transmission of a downlink frame from the plurality of base stations to the terminal on the basis of the reception information.

(2) The information processing device according to (1), in which the collection unit collects the reception information in which a detection timing, reception power, a detection frequency, and a reception result of each received uplink frame of each of the plurality of base stations are described.

(3) The information processing device according to (2), in which the processing unit determines a base station that transmits each downlink frame for each uplink frame received by the plurality of base stations on the basis of a result of combining pieces of the reception information collected from the plurality of base stations on the basis of the detection timing and the detection frequency.

(4) The information processing device according to (3), in which the processing unit determines a predicted transmission period and a transmission frequency of a downlink frame corresponding to each uplink frame on the basis of the detection timing and the detection frequency of each uplink frame.

(5) The information processing device according to (4), in which in a case where two or more downlink frames are transmitted in an overlapping manner at the same frequency and the same time, the processing unit determines a base station that transmits each downlink frame on the basis of the reception power of the uplink frame corresponding to each downlink frame.

(6) The information processing device according to (4) or (5), in which the processing unit determines, within a contention group in which two or more downlink frames are transmitted in an overlapping manner at the same frequency and the same time, downlink frame transmission performed by a base station having maximum reception power for the uplink frame, deletes a determined base station and a destination terminal from candidates, and sequentially determines downlink frame transmission performed by a base station having maximum reception power for the uplink frame among the remaining candidates.

(7) The information processing device according to (5) or (6), in which in a case where it is determined to perform downlink frame transmission from a base station that has failed in uplink frame reception, the processing unit specifies a destination terminal of the downlink frame on the basis of reception information of other base stations that have succeeded in uplink frame reception at the same detection timing and the same detection frequency.

(8) The information processing device according to any one of (3) to (7), in which the collection unit collects accompanying information of each terminal together with the reception information, and
the processing unit determines a base station that transmits each downlink frame for each uplink frame received by the plurality of base stations on the basis of the reception information corrected on the basis of the accompanying information.

(9) The information processing device according to (8), in which the accompanying information includes information regarding a position, a moving direction, and a moving speed of the terminal, and
the processing unit corrects the reception power of each uplink frame of the plurality of base stations on the basis of the position, the moving direction, and the moving speed of each terminal and position information of each base station.

(10) The information processing device according to any one of (1) to (9), in which
the plurality of base stations is notified of a result of cooperative processing performed by the processing unit.

(11) The information processing device according to any one of (1) to (10), in which
the terminal transmits the uplink frame a plurality of times, and in a case where the plurality of base stations transmits the downlink frame a plurality of times at a transmission time point determined on the basis of a reception time point of the uplink frame, the processing unit processes the cooperative transmission of the downlink frame from the plurality of base stations to the terminal.

(12) The information processing device according to any one of (1) to (10), in which
the terminal transmits the uplink frame a plurality of times by using a plurality of frequencies, and in a case where the plurality of base stations transmits the downlink frame a plurality of times at a transmission time point and a transmission frequency determined on the basis of a reception time point and a reception frequency of the uplink frame, the processing unit processes the cooperative transmission of the downlink frame from the plurality of base stations to the terminal.

(13) An information processing method including:
a collection step of collecting each piece of reception information of a plurality of base stations that receives an uplink frame from a terminal; and
a processing step of processing cooperative transmission of a downlink frame from the plurality of base stations to the terminal on the basis of the reception information.

REFERENCE SIGNS LIST 100, 101 Terminal
200, 201 Base station
300 Server
2101 Sensor data acquisition unit
2102 Frame generation unit
2103 Wireless resource determination unit
2104 Wireless control unit
2105 Wireless transmission unit
2106 Wireless reception unit
2107 Detection unit
2108 Frame combination unit
2109 Frame demodulation unit
2110 Data acquisition unit
2201 Wireless reception unit
2202 Filter
2203 Detection unit
2204 Frame combination unit
2205 Frame demodulation unit
2206 Data acquisition unit
2207 Server communication unit
2208 Frame generation unit
2209 Wireless control unit
2210 Wireless transmission unit
2301 Server communication unit
2302 Combined reception list generation unit
2303 Cooperative processing unit
2304 Downlink data holding unit

The invention claimed is:
1. An information processing device, comprising:
a collection unit configured to collect a plurality of pieces of reception information from a plurality of base stations, wherein
the plurality of base stations receives a plurality of uplink frames from a terminal,
each piece of the plurality of pieces of reception information and each uplink frame of the plurality of uplink frames is associated with a respective base station of the plurality of base stations,
the plurality of pieces of reception information includes:
reception power of each uplink frame of the plurality of uplink frames, and
a reception result of each uplink frame of the plurality of uplink frames, and
the reception result of each uplink frame of the plurality of uplink frames indicates one of:
a success of demodulation of a corresponding uplink frame of the plurality of uplink frames, or
a failure of the demodulation of the corresponding uplink frame; and
a processing unit configured to process, based on the plurality of pieces of reception information, cooperative transmission of a plurality of downlink frames from the plurality of base stations to the terminal.

2. The information processing device according to claim 1, wherein the plurality of pieces of reception information further includes a detection timing of each uplink frame of the plurality of uplink frames and a detection frequency of each uplink frame of the plurality of uplink frames.

3. The information processing device according to claim 2, wherein
the processing unit is further configured to:
combine the plurality of pieces of reception information based on the detection timing and the detection frequency; and
determine a first base station, from the plurality of base stations, based on the combined plurality of pieces of reception information, and
the determined first base station transmits each downlink frame of the plurality of downlink frames for each uplink frame of the plurality of uplink frames.

4. The information processing device according to claim 3, wherein
the processing unit is further configured to determine, based on the detection timing of each uplink frame of the plurality of uplink frames and the detection frequency of each uplink frame of the plurality of uplink frames, each of:
a predicted transmission period of each downlink frame of the plurality of downlink frames, and
a transmission frequency of each downlink frame of the plurality of downlink frames, and
each downlink frame of the plurality of downlink frames corresponds to a respective uplink frame of the plurality of uplink frames.

5. The information processing device according to claim 4, wherein
in a case where two or more downlink frames of the plurality of downlink frames are transmitted in an overlapping manner at a same frequency and a same time, the processing unit is further configured to determine a second base station from the plurality of base stations,
the second base station is determined based on the reception power of each uplink frame of the plurality of uplink frames, and
the determined second base station transmits each downlink frame of the plurality of downlink frames.

6. The information processing device according to claim 4, wherein the processing unit is further configured to:
  determine, within a contention group, a first downlink frame transmission performed by a second base station of the plurality of base stations, wherein
    the second base station has a maximum reception power for an uplink frame of the plurality of uplink frames, and
    the contention group includes two or more downlink frames, of the plurality of downlink frames, transmitted in an overlapping manner at a same frequency and a same time;
  delete the second base station and a destination terminal from candidates; and
  sequentially determine a second downlink frame transmission performed by a third base station of the plurality of base stations, wherein the third base station has the maximum reception power for the uplink frame among remaining candidates of the candidates.

7. The information processing device according to claim 5, wherein
  the processing unit is further configured to:
    determine that a third base station, of the plurality of base stations, performs a downlink frame transmission, wherein the third base station has failed in the reception of an uplink frame of the plurality of uplink frames; and
    determine a destination terminal of a downlink frame of the plurality of downlink frames,
  the destination terminal is determined based on:
    the determination that the third base station performs the downlink frame transmission, and
    a set of pieces of reception information associated with a set of base stations,
  the plurality of pieces of reception information includes the set of pieces of reception information,
  the plurality of base stations includes the set of base stations, and
  each base station of the set of base stations has succeeded in the reception of the uplink frame at a same detection timing and a same detection frequency.

8. The information processing device according to claim 3, wherein
  the collection unit is further configured to collect, with the plurality of pieces of reception information, accompanying information of each terminal of a plurality of terminals,
  the plurality of terminals includes the terminal,
  the processing unit is further configured to:
    correct the plurality of pieces of reception information based on the accompanying information; and
    determine, from the plurality of base stations, a second base station based on the corrected plurality of pieces of reception information, and
  the determined second base station transmits each downlink frame, of the plurality of downlink frames, for each uplink frame of the plurality of uplink frames.

9. The information processing device according to claim 8, wherein
  the accompanying information includes information regarding a position of each terminal of the plurality of terminals, a moving direction of each terminal of the plurality of terminals, and a moving speed of each terminal of the plurality of terminals, and
  the processing unit is further configured to correct the reception power of each uplink frame of the plurality of uplink frames based on:
    the position of each terminal of the plurality of terminals, the moving direction of each terminal of the plurality of terminals, and the moving speed of each terminal of the plurality of terminals, and
    position information of each base station of the plurality of base stations.

10. The information processing device according to claim 1, wherein the processing unit is further configured to notify the plurality of base stations of a result of a cooperative process.

11. The information processing device according to claim 1, wherein
  the terminal transmits an uplink frame, of the plurality of uplink frames, a plurality of times,
  in a case where the plurality of base stations transmits the plurality of downlink frames a plurality of times at a transmission time point, the processing unit is further configured to process the cooperative transmission of the plurality of downlink frames from the plurality of base stations to the terminal, and
  the transmission time point is determined based on a reception time point of the uplink frame.

12. The information processing device according to claim 1, wherein
  the terminal transmits an uplink frame, of the plurality of uplink frames, a plurality of times based on a plurality of frequencies,
  in a case where the plurality of base stations transmits the plurality of downlink frames, a plurality of times at a transmission time point and a transmission frequency, the processing unit is further configured to process the cooperative transmission of the plurality of downlink frames from the plurality of base stations to the terminal, and
  the transmission time point and the transmission frequency is determined based on a reception time point and a reception frequency of the uplink frame.

13. An information processing method, comprising:
  collecting a plurality of pieces of reception information from a plurality of base stations, wherein
    the plurality of base stations receives a plurality of uplink frames from a terminal,
    each piece of the plurality of pieces of reception information and each uplink frame of the plurality of uplink frames is associated with a respective base station of the plurality of base stations,
    the plurality of pieces of reception information includes:
      reception power of each uplink frame of the plurality of uplink frames, and
      a reception result of each uplink frame of the plurality of the uplink frames, and
    the reception result of each uplink frame of the plurality of uplink frames indicates one of:
      a success of demodulation of a corresponding uplink frame of the plurality of uplink frames, or
      a failure of the demodulation of the corresponding uplink frame; and
  processing, based on the plurality of pieces of reception information, cooperative transmission of a plurality of downlink frames from the plurality of base stations to the terminal.

14. An information processing device, comprising:
  a collection unit configured to collect a plurality of pieces of reception information collected from a plurality of base stations, wherein the plurality of base stations receives a plurality of uplink frames from a terminal, wherein each piece of the plurality of pieces of reception information and each uplink frame of the plurality of uplink frames is associated with a respective base station of the plurality of base stations, and wherein each piece of the plurality of pieces of reception information includes:
- a detection timing of each uplink frame of the plurality of uplink frames,
- reception power of each uplink frame of the plurality of uplink frames,
- a detection frequency of each uplink frame of the plurality of uplink frames, and
- a reception result of each uplink frame of the plurality of uplink frames; and a processing unit configured to process, based on the plurality of pieces of reception information, cooperative transmission of a plurality of downlink frames from the plurality of base stations to the terminal.

15. The information processing device according to claim 14, wherein the reception result corresponds to one of success or failure of demodulation of each uplink frame of the plurality of uplink frames.

* * * * *